United States Patent [19]

Foster

[11] 4,228,004
[45] Oct. 14, 1980

[54] METHOD AND APPARATUS FOR REMOVAL OF BY-PRODUCTS OF CHEMICAL VAPOR DEPOSITION FROM OIL FOR VACUUM PUMP

[75] Inventor: Robert B. Foster, Riverside, Calif.

[73] Assignee: Thermco Products Corporation, Orange, Calif.

[21] Appl. No.: 29,525

[22] Filed: Apr. 12, 1979

[51] Int. Cl.² ............................................. B01D 23/24
[52] U.S. Cl. ..................................... 210/739; 210/100; 210/104; 210/138; 210/143; 210/168; 210/258; 427/255.2; 118/715; 210/741; 210/744; 210/803; 210/804; 210/806; 210/791
[58] Field of Search .................... 210/79, 83, 84, 97, 210/100, 104, 106, 108, 138, 139, 140, 143, 167, 168, 258, 259, 332, 333 R, 333.1, 513; 427/248; 118/715, 719

[56] References Cited

U.S. PATENT DOCUMENTS 3,900,597  8/1975  Chruma ................................. 427/82

OTHER PUBLICATIONS

H. Kurokawa et al., "Low Pressure CVD Films Growth Technique and its Equipment," IEEE Denshi Tokyo, 1977, 86–88.
L. I. Maissel et al., Handbook of Thin Film Technology, McGraw-Hill Book Co., N.Y., 1970, 2–4 through 2–17.
Baumeister et al., Marks' Standard Handbook for Mechanical Engineers, McGraw-Hill Book Co., N.Y., 1970, 14–45 through 14–48.
O'Connor, Standard Handbook of Lubrication Engineering, McGraw-Hill Book Co., New York, 1968, 30-1-3-0-3, 25-34-25-38, 25-39.
W. A. Kohler, "Structural Properties of Vapor Deposited Silicon Nitride," Metallurgical Transactions, vol. 1, Mar. 1970, 735–740.
Ginsburgh et al., "Silicon Nitride Chemical Vapor Deposition in Hot-Wall Diffusion System," Journal of Electrochemical Society, vol. 125, No. 9, Sep. 1978, 1557–1559.
R. S. Rosler, "Low Pressure CVD Production Processes for Poly, Nitride and Oxide," Solid State Technology, Apr. 1977, 63–70.
"Setting Synchronous Motor Driven Automatic Reset General Purpose Timer," Publication In 325, Apr. 1975.
Stokes Division, Pennwalt Corp., "Model 339 Vacuum Pump Oil Purifier," Specification No. 339-1.
Bailey, The Lubrication Engineers Manual, U.S. Steel Corp., 1971, pp. 12–14.
American Timing and Controls Co., Div. American Manufacturing Co., Inc., "Installation and Apparatus Instructions/Series 326, 'Tankard' Converter, Digital Setting, Pulse–Motor Driven Automatic Reset General Purpose Count Controller," Publication In 328, Apr. 1975.
American Timing and Controls Co., Div. American Manufacturing Co., Inc., "Installation and Operating Instruction Series 325, 'Tankard' Digital Setting Synchronous Motor Driven Automatic Reset General Purpose Timer," Publication In 325, Apr. 1975.
Stokes Divisional, Pennwalt Corp., "Model 339 Vacuum Pump Oil Purifier," Specification No. 339-1.

Primary Examiner—Ernest G. Therkorn
Attorney, Agent, or Firm—George R. Clark; Neil M. Rose; Allen J. Hoover

[57] ABSTRACT

For a vacuum pump, as used to maintain a partial vacuum in a diffusion furnace for chemical vapor deposition in intermittent runs wherein oil for the vacuum pump becomes contaminated by particulates, an apparatus for removal of particulates from oil for the vacuum pump comprises a settling tank, which is connected to receive oil from the vacuum pump, an oil pump, which is arranged to pump oil from the settling tank, means for filtering particulates from oil pumped from the settling tank, a plurality of oil valves, which are arranged to control flow of oil from the vacuum pump, through the settling tank, through the filtering means, and into the vacuum pump, means for operating the oil pump and opening the oil valves for timed intervals wherein oil flows from the vacuum pump, through the settling tank, through the filtering means, and to the vacuum pump, and means for coordinating the intervals with the runs so that each interval is initiated approximately when a run is terminated.

32 Claims, 15 Drawing Figures

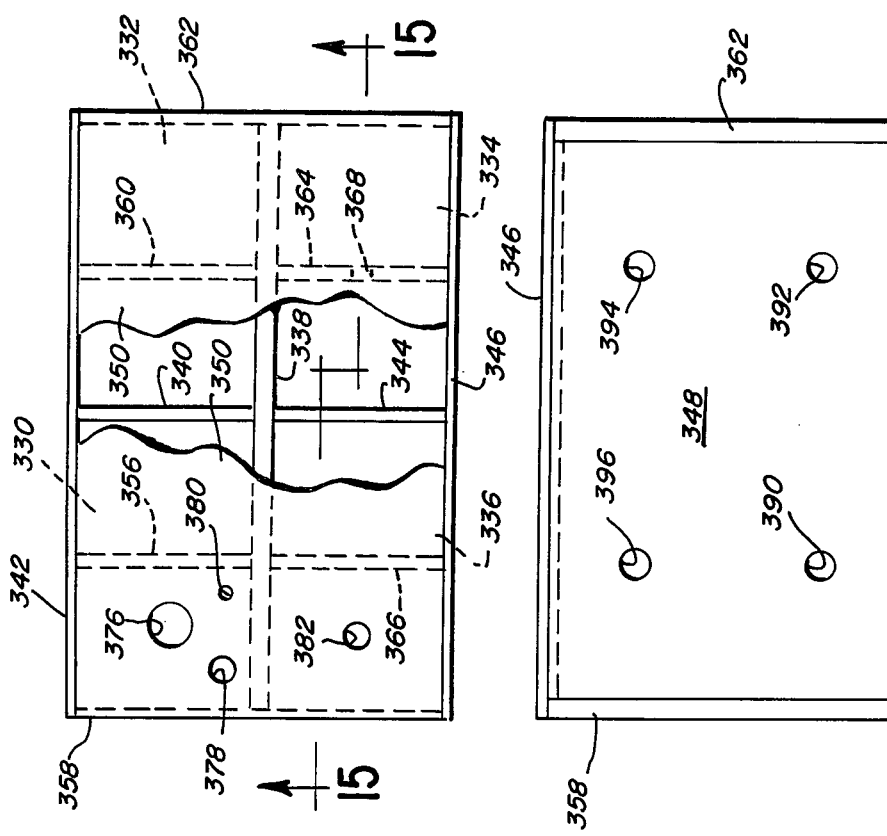
FIG. 14
FIG. 16
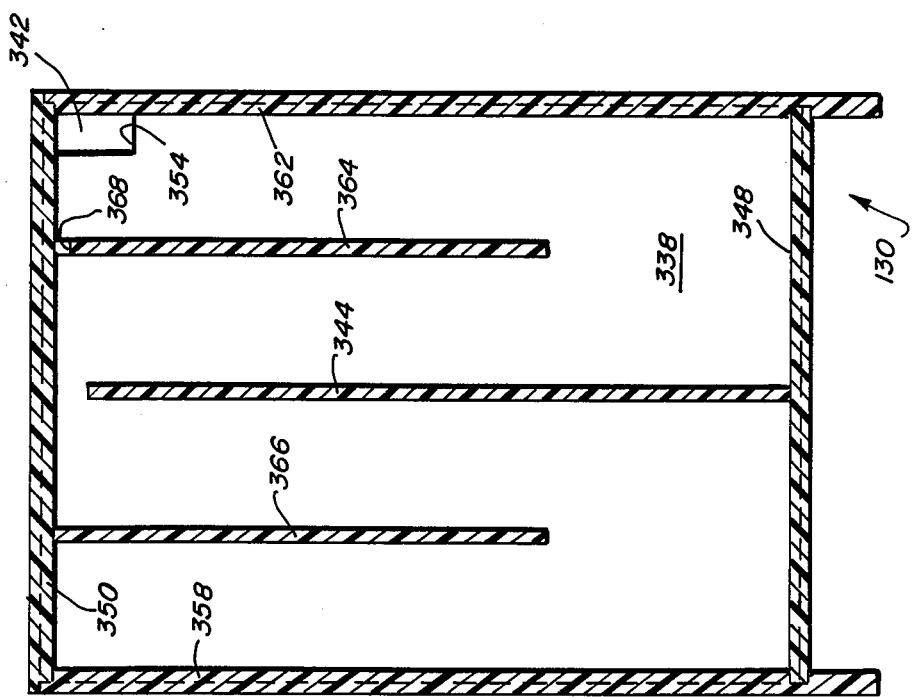
FIG. 15

METHOD AND APPARATUS FOR REMOVAL OF BY-PRODUCTS OF CHEMICAL VAPOR DEPOSITION FROM OIL FOR VACUUM PUMP

BACKGROUND OF THE INVENTION

This invention pertains to a method and an apparatus for removal of particulates from oil in a vacuum pump, as used to maintain a partial vacuum in a diffusion furnace for chemical vapor deposition in intermittent runs wherein oil for the vacuum pump becomes contaminated by particulates. In chemical vapor deposition of thin films of various materials on various substrates in a diffusion furnace, in which a partial vacuum is maintained by an oil-sealed mechanical vacuum pump, it is common for by-products to be formed as particulates, which contaminate oil for the vacuum pump, and which must be removed at least intermittently from oil for the vacuum pump so as to avert damage to the vacuum pump and/or loss of partial pressure.

Chemical vapor deposition of thin films of silicon nitride, $Si_3N_4$, is used for its masking, passivating, and insulating capabilities, particularly for its resistance to diffusion of ionic contaminants. Silicon nitride, $Si_3N_4$, may be deposited in various reactions of various reactants, as exemplified by silane, $SiH_4$, and ammonia, $NH_3$, and by silicon tetrachloride. $SiCl_4$, and ammonia, $NH_3$. Pertinent references include W. A. Kohler, "Structural Properties of Vapor Deposited Silicon Nitride," *Metallurgical Transactions*, Vol. 1, March 1970, pages 735 through 740, and R. Ginsburgh et al., "Silicon Nitride Chemical Vapor Deposition in a Hot-Wall Diffusion System," *Journal of the Electrochemical Society*, Vol. 125, No. 9, September 1978, pages 1557 through 1559.

As an example of particular interest, it is known to deposit thin films of silicon nitride, $Si_3N_4$, on silicon substrates by chemical vapor deposition in a diffusion furnace, in which a partial vacuum is maintained by an oil-sealed mechanical vacuum pump, which is maintained at an interior temperature of about 800° C., and into which reactive gases—three standard parts of ammonia, $NH_3$, and one standard part of dichlorosilane, $SiH_2Cl_2$—are metered, whereupon ammonium chloride, $NH_4Cl$, is produced as a by-product, and as particulates, which contaminate oil for the vacuum pump, and which must be removed at least intermittently from oil for the vacuum pump so as to avert damage to the vacuum pump and/or loss of partial pressure. Pertinent references include R. S. Rosler, "Low Pressure CVD Production Processes for Poly, Nitride, and Oxide," *Solid State Technology*, April 1977, at pages 63 through 70, and H. Kurokawa et al., "Low-Pressure CVD Films Growth Technique and its Equipment," *IEEE Denshi Tokyo*, 1977, pages 86 through 88.

It is known to filter particulates from oil for a vacuum pump, as used to maintain a partial vacuum in a diffusion furnace for chemical vapor deposition as discussed above, in microporous filters having replaceable cartridges, through which oil for the vacuum pump is circulated as the vacuum pump is operated. Such filters tend to become clogged rapidly, whereupon the vacuum pump must be shut down frequently, so as to permit clogged cartridges to be changed. Usage of oil under these conditions is high.

Experimental attempts have been made to remove particulates from oil for a vacuum pump, as used as in the example discussed above, by withdrawing oil from the vacuum pump to a settling tank, pumping oil from the settling tank, filtering particulates from oil pumped from the settling tank in a series of microporous filters having replaceable cartridges, and returning oil to the vacuum pump after passage through the cartridges, for timed intervals, wherein each interval has been initiated upon a timed measurement that accumulated running time of a predetermined duration had elapsed in serial runs, which tended to vary in duration from run to run. Such attempts have not been consistently satisfactory, as the cartridges nonetheless tended to become clogged excessively in some runs, sometimes before the runs had terminated.

A medium to high vacuum from about $450 \times 10^{-3}$ Torr to about $5 \times 10^{-3}$ Torr is maintained in a diffusion furnace for chemical vapor deposition as discussed above. Various types of oil-sealed mechanical vacuum pumps, as may be used to maintain such a vacuum, are discussed in standard references including L. I. Maissel et al., Eds., *Handbook of Thin Film Technology*, McGraw-Hill Book Company, New York, 1970, under "Vacuum Pumps" at pages 2-4 through 2-17, and T. Baumeister et al., Eds., *Marks' Standard Handbook for Mechanical Enginners*, 8th Ed., McGraw-Hill Book Company, New York, 1970, under "High Vacuum Pumps" at pages 14-45 through 14-48.

Conventional settling and filtering techniques for removal of particulates from oil are discussed in standard references including J. J. O'Connor, Ed., *Standard Handbook of Lubrication Enginnering*, McGraw-Hill Book Company, New York, 1968, under "Lubricant Reclamation and Conditioning" at pages 30—1 through 30-3, under "Oil Purifiers" at pages 25-34 through 25-38, and under "Pumps" at pages 25-38 and 25-39, and C. A. Bailey et al., *The Lubrication Engineers Manual*, U.S. Steel Corporation, 1971, under "Oil Contaminants and Their Removal" at pages 12 through 14.

Herein, "oil" refers to any natural or synthetic oil which may be used in a vacuum pump as discussed above, and which may become contaminated by particulates as discussed above.

SUMMARY OF THE INVENTION

In deposition of silicon nitride, $Si_3N_4$, on silicon substrates by chemical vapor deposition in a diffusion furnace, in which a partial vacuum is maintained by an oil-sealed mechanical vacuum pump, which is maintained at an interior temperature of about 800° C., and into which reactive gases—three standard parts of ammonia, $NH_3$, and one standard part of dichlorosilane, $SiH_2Cl_2$—are metered, whereupon ammonium chloride, $NH_4Cl$, is produced, as mentioned above, it has been appreciated as significant that particulates of ammonium chloride, $NH_4Cl$, tend to grow during each run, apparently by agglomeration on nuclei of ammonium chloride, $NH_4Cl$, whereupon oil for the vacuum pump tends to range from milky suspensions of small particles of ammonium chloride, $NH_4Cl$, at initial stages of each run to muddy suspensions of large particles of ammonium chloride, $NH_4Cl$, at terminal stages of each run. At initial stages of each run, the suspensions tend to act as colloidal suspensions. The particles tend to be largest at terminal stages of a series of runs.

Accordingly, it has been found that removal of particulates from oil for a vacuum pump, as used to maintain a partial vacuum for chemical vapor deposition in intermittent runs wherein oil for the vacuum pump becomes contaminated by particulates, is effected by a method according to this invention and comprising steps of withdrawing oil from the vacuum pump to a settling tank, pumping oil from the settling tank, filtering particulates from oil pumped from the settling tank, and returning oil to the vacuum pump after particulates are filtered therefrom, wherein said steps are performed for timed intervals coordinated with the runs so that each interval is initiated approximately when a run is terminated.

Each interval may be initiated approximately when a run concluding a predetermined number of serial runs is terminated. The intervals may be coordinated with the runs by steps of generating signals corresponding approximately to terminal stages of serial runs and initiating the steps performed for timed intervals whenever a predetermined number of said signals have been counted. The signals may be counted by means reset for another count after the predetermined number of said signals have been counted.

Furthermore, a level of oil in the vacuum pump, a level of oil in the settling tank, and back pressure attending the filtering step may be monitored, whereupon the steps performed for timed intervals may be disabled whenever the monitored level of oil in the vacuum pump falls below a predetermined level for oil in the vacuum pump, whenever the monitored level of oil in the settling tank falls below a predetermined level for oil in the settling tank, or whenever back pressure attending the filtering step exceeds a predetermined pressure. Thus, oil pumped from the settling tank may be filtered as through a series of microporous filters having replaceable cartridges, back pressure exhibited by the series of microporous filters may be monitored, and the steps performed for timed intervals may be disabled whenever the series exhibits back pressure above a predetermined pressure.

Accordingly, it has been found that removal of particulates from oil for a vacuum pump, as used to maintain a partial vacuum for chemical vapor deposition in intermittent runs wherein oil for the vacuum pump becomes contaminated, is effected in and by means of an apparatus according to this invention and comprising a settling tank, which is connected to receive oil from the vacuum pump, an oil pump, which is arranged to pump oil from the settling tank, means for filtering particulates from oil pumped from the settling tank, a plurality of oil valves, which are arranged to control flow of oil from the vacuum pump, through the settling tank, through the filtering means, and into the vacuum pump, means for operating the oil pump and opening the oil valves for timed intervals wherein oil flows from the vacuum pump, through the settling tank, through the filtering means, and to the vacuum pump, and means for coordinating the intervals with the runs so that each interval is initiated approximately when a run is terminated.

Each interval may be initiated approximately when a run concluding a predetermined number of serial runs is terminated. The coordinating means may comprise means for generating signals corresponding to terminal stages of serial runs and means for counting said signals, and means for enabling the oil pump-operating and valve opening means whenever a predetermined number of said signals have been counted. The counting means may be reset for another count after the predetermined number of said signals have been counted.

Furthermore, the apparatus may comprise means for monitoring a level of oil in the vacuum pump and disabling the oil pump-operating and oil valve-opening means whenever the monitored level of oil in the vacuum pump falls below a predetermined level for oil in the vacuum pump, means for monitoring a level of oil in the settling tank and disabling the oil pump-operating and oil valve-opening means whenever the monitored level of oil in the settling tank falls below a predetermined level for oil in the settling tank, and means for monitoring back pressure exhibited by the filtering means and disabling the oil pump-operating and oil valve-opening means whenever the filtering means exhibits back pressure above a predetermined pressure, whereby the oil pump cannot be operated and the oil valves cannot be opened whenever level of oil in the vacuum pump falls below the predetermined level for oil in the vacuum pump, whenever the monitored level of oil in the settling tank falls below the predetermined level of oil for the settling tank, or whenever the filtering means exhibits back pressure above the predetermined pressure. Thus, the filtering means may comprise a series of microporous filters, and the apparatus may comprise means for monitoring back pressure exhibited by each filter and disabling the oil pump-operating and oil valve-opening means whenever the filters exhibit back pressure above a predetermined pressure for the filter, whereby the oil pump cannot be operated and the oil valves cannot be opened whenever a filter exhibits back pressure above the predetermined pressure for the filter.

This invention has particular utility for removal of particulates from oil for a vacuum pump, as used to maintain a partial vacuum for chemical vapor deposition in intermittent runs wherein oil for the vacuum pump becomes contaminated by particulates tending to grow during each run, as exemplified by particulates of ammonium chloride, $NH_4Cl$, as by-products of deposition of silicon nitride, $Si_3N_4$, on silicon substrates by chemical vapor deposition in a diffusion furnace, which is maintained at a partial vacuum and at an interior temperature of about 800° C., and into which reactive gases—three standard parts of ammonia, $NH_3$, and one standard part of dichlorosilane, $SiH_2Cl_2$—are metered, as discussed above. It has been found that smaller particles of ammonium chloride, $NH_4Cl$, tend to be found in oil for a vacuum pump at earlier stages of each run and to pass through the settling tank, whereas larger particles of ammonium chloride, $NH_4Cl$, tend to be found in oil for the vacuum pump at terminal stages of each run and to settle in the settling tank, whereupon fewer particles tend to pass through the settling tank at terminal stages of each run. As compared to what is described as conventional above, it has been found for comparable running times for deposition of silicon nitride, $Si_3N_4$, that effective life of each filter thus can be extended as much as fifty times or more, that downtime for filter changes can be cut correspondingly, and that usage of oil can be cut significantly.

BRIEF DESCRIPTION OF THE DRAWINGS

In FIGS. 6 and 7, certain connections are broken for clarity of illustration but are to be considered as joined where indicated at C, D, and E respectively.

FIG. 14 is a top plan view of a settling tank of the preferred embodiment of FIGS. 2 through 7, a portion of a top panel being broken away for clarity of illustration.

FIG. 15 is a sectional view taken along line 15—15 of FIG. 12 in the direction of the arrows.

FIG. 16 is a bottom plan view of the settling tank as viewed from beneath in FIG. 14.

DETAILED DESCRIPTION OF PREFERRED EMBODIMENT

As aforementioned, the method and the apparatus of this invention remove particulates from oil for a vacuum pump, as used to maintain a partial vacuum in a diffusion furnace for chemical vapor deposition of various materials on various substrates in intermittent runs wherein oil for the vacuum pump becomes contaminated by particulates. In the example of particular interest, silicon nitride, $Si_3N_4$, is deposited on silicon substrates by chemical vapor deposition in intermittent runs wherein oil for the vacuum pump becomes contaminated by particulates of ammonium chloride, $NH_4Cl$.

Figure 1:
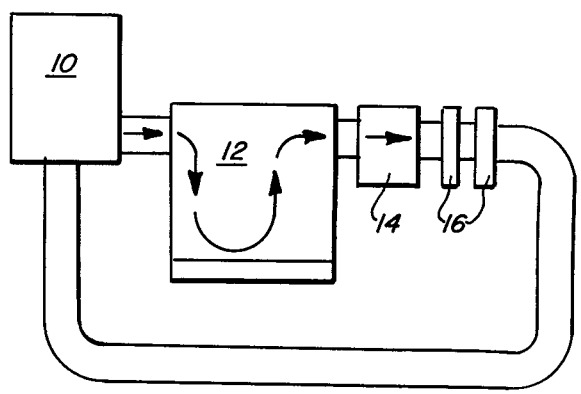
FIG. 1 is a diagram according to this invention and showing removal of particulates from oil for a vacuum pump, as used to maintain a partial vacuum in a diffusion furnace for chemical vapor deposition in intermittent runs wherein oil for the vacuum pump becomes contaminated by particulates.
Figure 2:
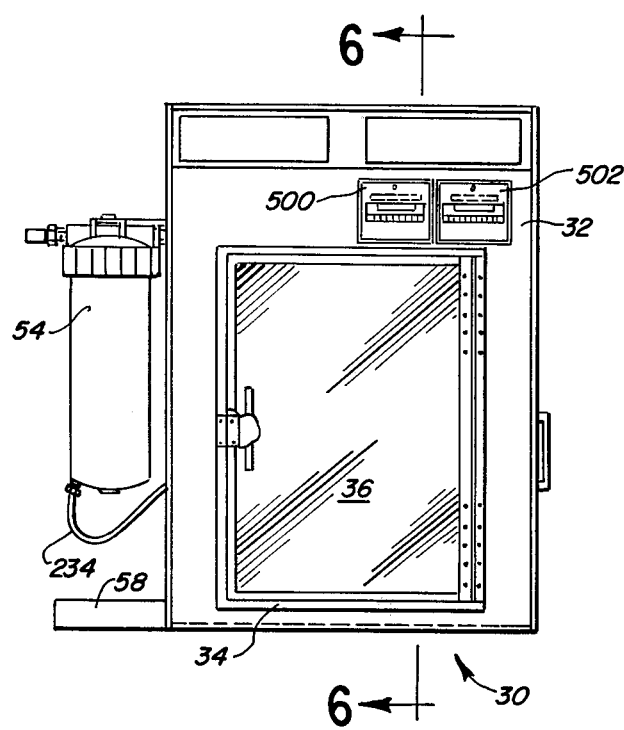
FIG. 2 is a front elevational view of a preferred embodiment of an apparatus according to this invention.
Figure 3:
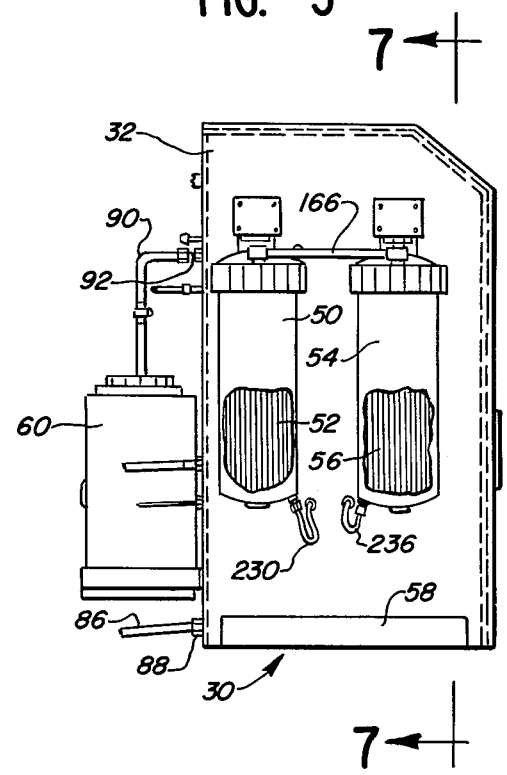
FIG. 3 is a side elevational view taken from the left side of FIG. 2.
Figure 4:
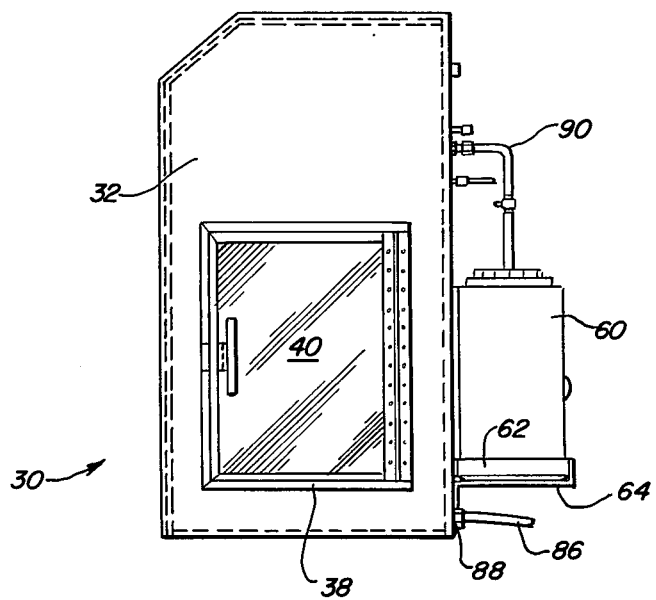
FIG. 4 is a side elevational view taken from the right side of FIG. 2.
Figure 5:
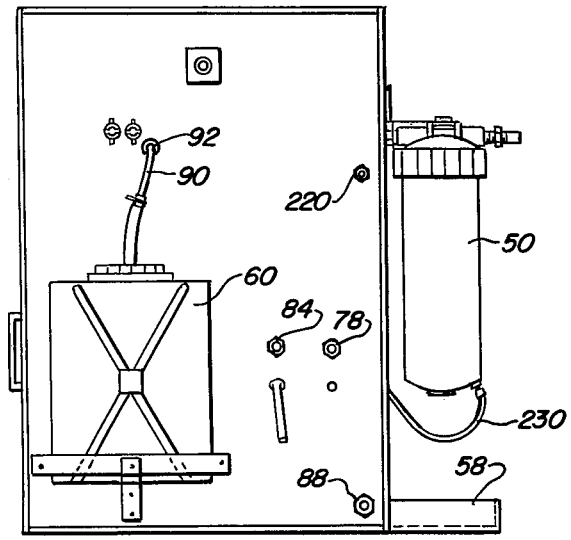
FIG. 5 is a rear elevational view of the apparatus of FIG. 2.

As diagrammed in FIG. 1, oil is withdrawn from the vacuum pump 10 to a settling tank 12, in which particulates of large size tend to settle, whereupon oil is pumped by means of an oil pump 14 from the settling tank 12 through a series of microporous filters 16, in which particulates are filtered from oil pumped from the settling tank 12, whereupon oil is returned to the vacuum pump 10. As contemplated by this invention, these operations are performed for timed intervals, which are coordinated with the runs so that each interval is initiated approximately when a run is terminated.

As shown in FIGS. 2 through 5, a preferred embodiment of this invention is constituted in and by means of an apparatus 30 comprising an enclosure 32, which is adapted to stand on a floor, and which has a pair of hinged doors for ready access to interior components, a front door 34 having a glass window 36 and a side door 38 having a glass window 40. The side door 38 is located on the right side of the enclosure 32. The glass windows allow visual inspection of interior components. Various electrical components, as described below, may be controlled by an operator from the front of the enclosure 32. On its left side, the enclosure 32 supports a first filter housing 50, which contains a replaceable microporous cartridge 52 having a pore size of about 25 microns, and a second filter housing 54, which contains a replaceable microporous cartridge 56 having a pore size of about 5 microns. The filter housing 50 and the filter housing 54 are connected serially, as described below, whereby oil is filtered through the cartridge 52 before it is filtered through the cartridge 56. A drip pan 58 is mounted to the enclosure 32 beneath the filter housing 50 and the filter housing 52. On its back, the enclosure 32 supports a carboy 60, which is mounted to the enclosure 32 by a lateral bracket 62 and a lower bracket 64, and which holds a supply of oil.

Figure 9:
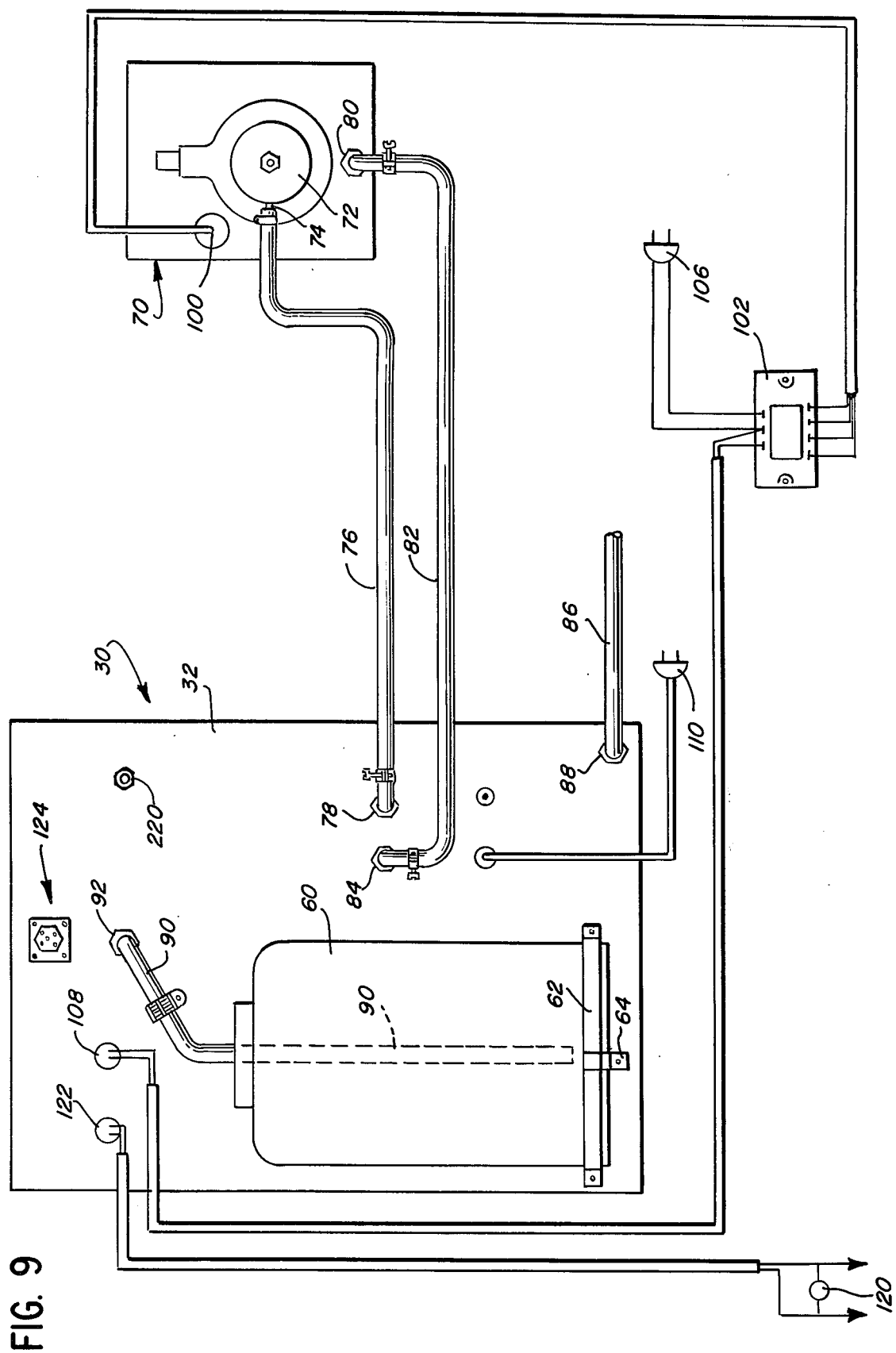
FIG. 9 is a diagrammatic view showing external connections of the apparatus of FIG. 2 through FIG. 7 to a vacuum pump, a drain, etc.

As shown in FIG. 9, the apparatus 32 may be associated with an oil-sealed mechanical vacuum pump 70 of a conventional type having a filter housing 72, which conventionally holds a replaceable microporous cartridge, but in which no cartridge is used here. A fitting 74 is mounted in a side wall of the filter housing 72 and connected, via a flexible transparent conduit 76, to a fitting 78 mounted in the back wall of the enclosure 32. Oil is returned from the apparatus 30 to the vacuum pump 70 through the fitting 78, the conduit 76, and the fitting 74. The vacuum pump 70 has another fitting 80, which conventionally connects the vacuum pump 70 to a drain, but which is connected, via another flexible transparent conduit 82 to another fitting 84 mounted in the back wall of the enclosure 32. Oil is withdrawn from the vacuum pump 70 to the apparatus 30 through the fitting 80, the conduit 82, and the fitting 84. Another conduit 86 connects another fitting 88 mounted in the back wall of the enclosure 32 to a drain. Another conduit 90 connects the carboy 60 to another fitting 92 mounted on the back wall of the enclosure 32.

Figure 8:
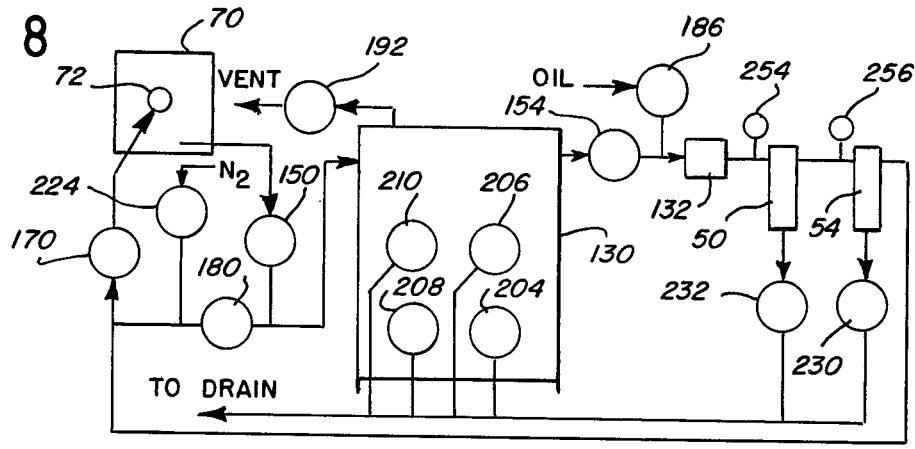
FIG. 8 is a flow diagram of the apparatus of FIGS. 2 through 7.

As also shown in FIG. 9, the vacuum pump 70 is equipped with an optical-electronic sensor 100, which may be Ryan-Herco Model No. 6920-999, which monitors a level of oil in the vacuum pump 70, and which is connected through a connecting module 102 to a source of line voltage (120VAC, 60 Hz) via a plug 106 and to a connector 108 mounted in the back wall of the enclosure 32. Another plug 110 is provided to connect the apparatus 30 to the source of line voltage (120VAC, 60 Hz). A solenoid valve 120, as indicated on FIG. 9, is used to admit reactive gas (dichlorosilane, $SiH_2Cl_2$, in the example of particular interest) to a diffusion furnace (not shown) for chemical vapor deposition under a partial vacuum maintained by the vacuum pump 70. The solenoid valve 120 is opened for a run and is closed when the run is terminated. A connector 122 mounted in the back wall of the enclosure 32 is connected to the solenoid valve 120 so as to be energized whenever the solenoid valve 120 is energized and deenergized whenever the solenoid valve 120 is deenergized. Electrical connections suggested in FIG. 8 are detailed in FIGS. 10, 11, 12 to be described below. Another connector 124 mounted in the back wall of the enclosure 32 allows a remote indicator to be used as described below.

Figure 6:
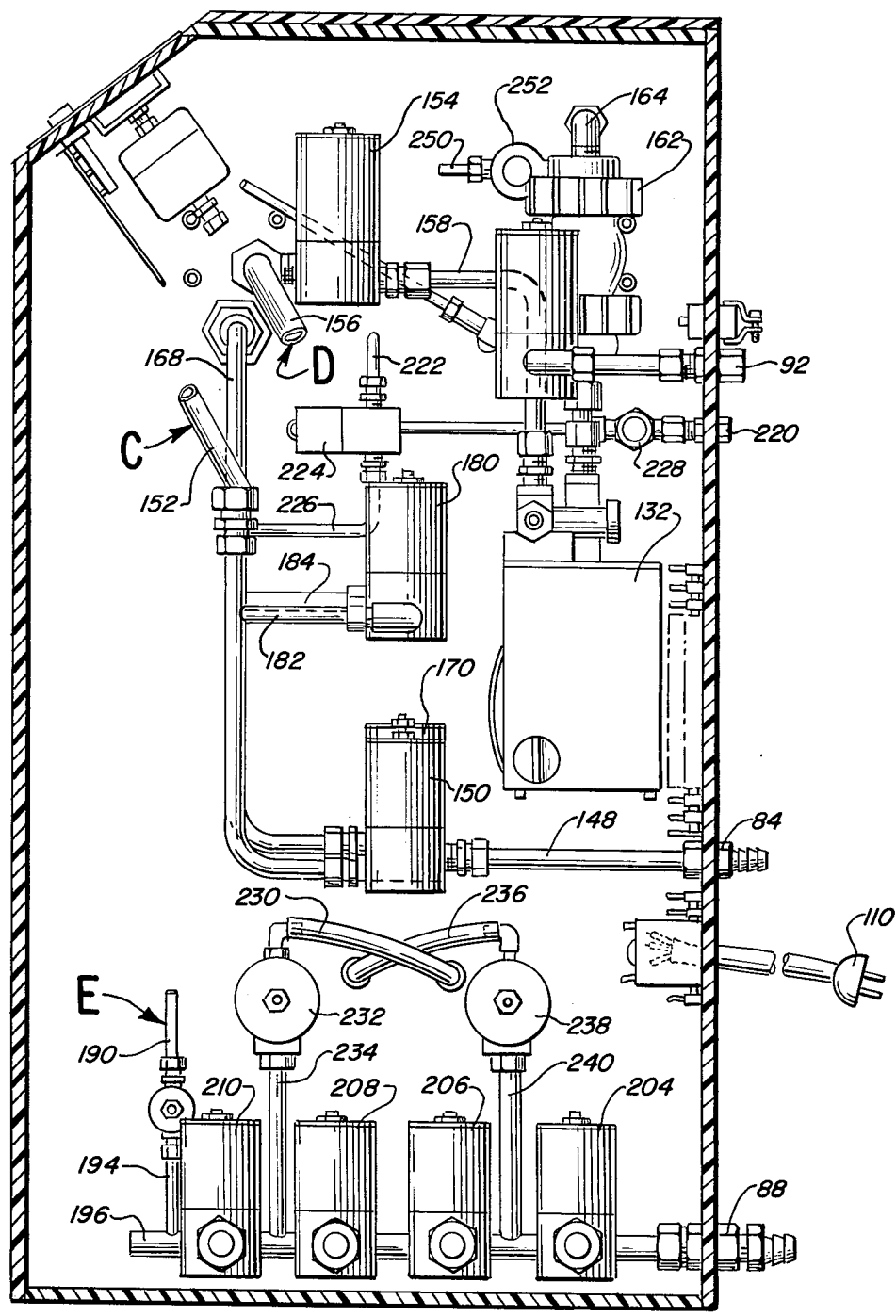
FIG. 6 is a sectional view, on an enlarged scale, taken along line 6—6 of FIG. 2, in the direction of the arrows, wherein certain background is omitted for clarity of illustration.
Figure 7:
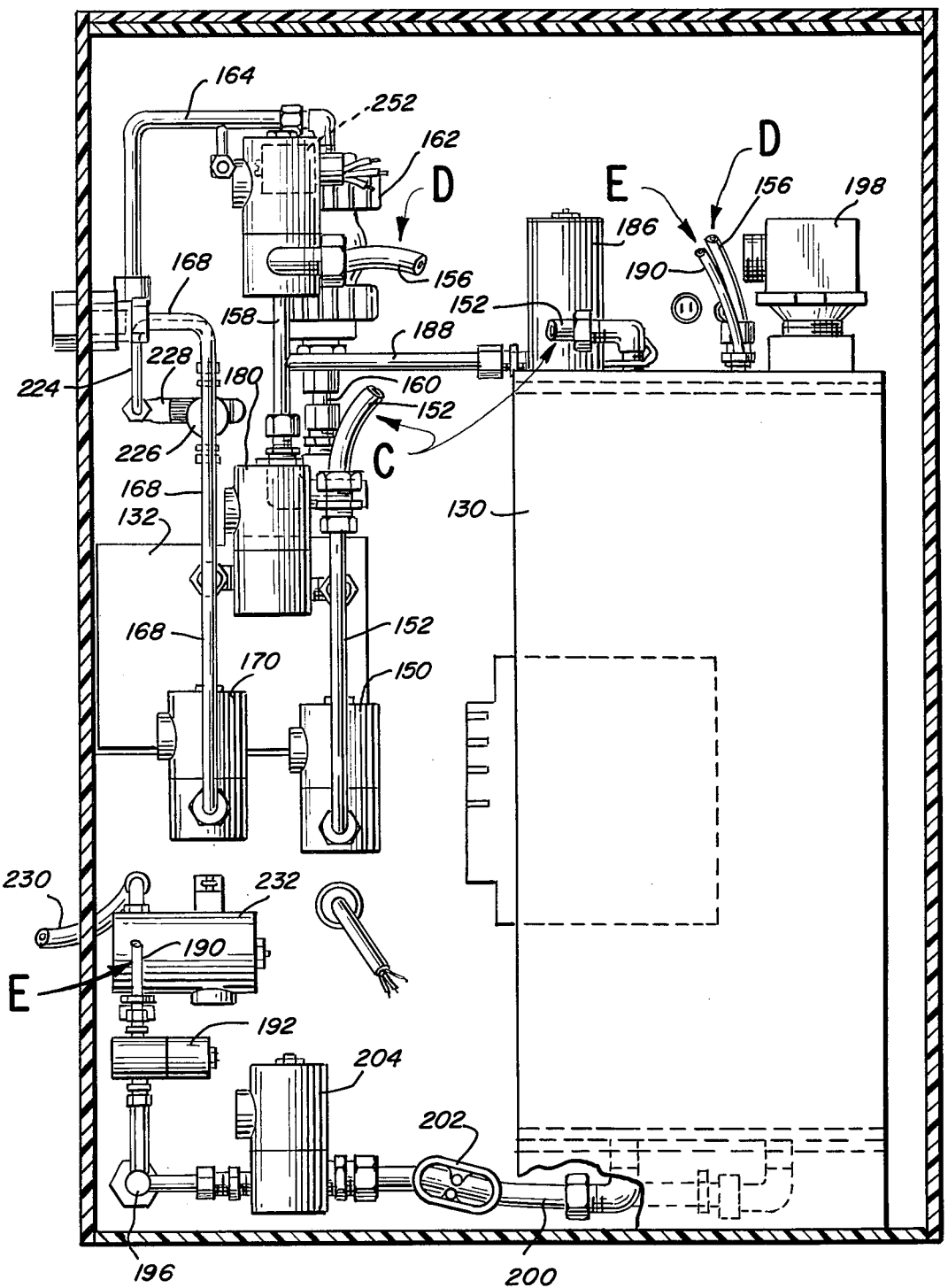
FIG. 7 is a sectional view, on a similar scale, taken along line 7—7 of FIG. 3, in the direction of the arrows, wherein certain background is omitted for clarity of illustration.

As shown in FIGS. 6 and 7, the apparatus 30 comprises a settling tank 130, which has a series of four baffled compartments to be described below, and an oil pump 132, which may be Filter-Chem Model FC-212-

10. The oil pump 132 withdraws oil from the vacuum pump 70 (FIG. 8) into the settling tank 130 and pumps oil from the settling tank 130 through the filter assembly 50 and the filter assembly 54 whereupon oil is returned to the vacuum pump 70.

A conduit 148 connects the fitting 84 to a solenoid valve 150. The solenoid valve 150 controls flow of oil withdrawn from the vacuum pump 70. A conduit 152, a section of which is broken away at C in FIGS. 6 and 7, connects the solenoid valve 150 to an inlet of the settling tank 130. A solenoid valve 154 controls flow of oil from an outlet of the settling tank 130. A conduit 156, a section of which is broken away at D in FIGS. 6 and 7, connects the outlet of the settling tank 130 to the solenoid valve 154. A conduit 158 connects the solenoid valve 154 to an inlet of the oil pump 132. A conduit 160 connects an outlet of the oil pump 132 to a check valve 162, connected by a conduit 164 to an inlet of the filtering assembly 50. A conduit 166 (FIG. 3) connects an outlet of the filtering assembly 50 to an inlet of the filtering assembly 54. A conduit 168 connects an outlet of the filtering assembly 54 to a solenoid valve 170. The solenoid valve 170 controls flow of oil returned to the vacuum pump 70. A conduit (not shown) connects the solenoid valve 170 to the fitting 78. The conduits mentioned in this paragraph comprise conventional assemblages of conventional threaded and other fittings, rigid tubing, and flexible tubing, as shown.

In a settling and filtering cycle, which is initiated automatically as described below, oil is withdrawn from the vacuum pump 70 through the fitting 80, the conduit 82, the fitting 84, the conduit 148, the solenoid valve 150, and the conduit 152, to the settling tank, in which large particles tend to settle. Oil is pumped from the settling tank 130 by the oil pump 132 through the conduit 156, the solenoid valve 154, the conduit 158, the oil pump 132, the conduit 160, the check valve 162, the conduit 164, the filter housing 50 containing the replaceable microporous cartridge 52, the conduit 166, the filter housing 54 containing the replaceable microporous cartridge 56, the conduit 168, the solenoid valve 170, the conduit (not shown) connecting the solenoid valve 170 to the fitting 78, the fitting 78, the conduit 76, the fitting 74, and the filter housing 72, to the vacuum pump 70.

A solenoid valve 180 is connected between the conduit 152 and the conduit 168 so as to bypass the vacuum pump 70. A conduit 182 connects the solenoid valve 180, at a tee as shown, to the conduit 152. A conduit 184 connects the solenoid valve 180, at a tee as shown, to the conduit 168. A solenoid valve 186 is connected to the fitting 92 by a conduit (not shown) so as to receive oil from the carboy 60 through the conduit 90. A conduit 188 connects the solenoid valve 192, at a tee as shown, to the conduit 158 between the solenoid valve 154 and the oil pump 132. A conduit 190, a section of which is broken away at E in FIGS. 6 and 7, connects a vent of the settling tank 130 to a solenoid valve 192. A conduit 194 connects solenoid valve 192 to a manifold 196, which is connected to the drain, via the fitting 88 and the conduit 86 (FIG. 9). A liquid-level switch 198, which may be Ryan-Herco Model 6920-110, is mounted so as to monitor a level of oil in the settling tank 130. The conduits mentioned in this paragraph comprise conventional assemblages of conventional threaded and other fittings, rigid tubing, and flexible tubing, as shown.

If the solenoid valves 180, 186, and 192 are opened, if the oil pump 132 is operated, and if the other solenoid valves of the apparatus 30 are closed, as in a sequence to be initiated manually whenever desired as described below, oil from the carboy 60 fills the settling tank 130, to a level controlled by the liquid-level switch 198 as described below. Oil flows from the carboy 60 through the conduit 90, the fitting 92, the conduit (not shown) connecting the fitting 92 and the solenoid valve 186, the solenoid valve 186, the conduit 188, the conduit 158, the oil pump 132, the conduit 160, the conduit 164, the filter housing 50 containing the replaceable microporous cartridge 52, the conduit 166, the filter housing 54 containing the replaceable microporous cartridge 56, the conduit 168, the solenoid valve 180 bypassing the vacuum pump 70, and the conduit 152, to the inlet of the settling tank 130, while air from the settling tank 130 is vented through the vent of the settling tank 130, the conduit 190, the solenoid valve 192, the conduit 194, the manifold 196, the fitting 88, and the conduit 86, to the drain.

Each of the four chambers of the settling tank 130 has a drain outlet connected by a conduit to a solenoid valve, by the solenoid valve to the manifold 196, and thus to the drain. As indicated in FIG. 7, a conduit 200, a flexible section of which may be clamped by a manual clamp 202, connects the outlet of one chamber of the settling tank to a solenoid valve 204. Similar solenoid valves 206, 208, and 210 are shown in FIG. 6 for the other chambers of the settling tank 130. The solenoid valves 204, 206, 208, and 210 are connected to the manifold and thus to the drain. If one or more of the solenoid valves 204, 206, 208, and 210 are opened, if the solenoid valve 180 and the solenoid valve 186 are opened, if the oil pump 132 is operated, and if the other solenoid valves of the apparatus 30 are closed, oil from the carboy 60 flows, as it flows when the settling tank 130 is filled as described above, and displaces sediment from the settling tank 130 through whichever of the solenoid valves 204, 206, 208, and 210 are opened to the drain.

Provision also is made for the settling tank 130 to be purged with nitrogen. A fitting 220 mounted in the back wall of the enclosure 32 may be connected to a source (not shown) of nitrogen at regulated pressure not to exceed about 5 psig. A conduit 222 connects the fitting 220 to a solenoid valve 224. A conduit 226 connects the solenoid valve 224, at a tee as shown, to the conduit 168. If any one of the solenoid valves 204, 206, 208, and 210 are opened, if the solenoid valve 180 and the solenoid valve 224 are opened, and if the other solenoid valves described above and to be described below are closed, nitrogen purges oil and sediment from the settling tank 130 through whichever of the solenoid valves 204, 206, 208, and 210 is opened, to the drain. A metering valve 228 between the fitting 220 and the conduit 222 may be set to control flow of nitrogen.

Provision also is made for the filter housing 50 and the filter housing 54 to be purged with nitrogen. The filter housing 50 has a drain outlet connected by a conduit 230 to a solenoid valve 232. The solenoid valve 232 is connected by a conduit 234 to the manifold 196 and thus to the drain. The filter housing 54 has a drain outlet connected by a conduit 236 to a solenoid valve 238. The solenoid valve 238 is connected by a conduit 240 to the manifold 196 and thus to the drain. If solenoid valve 232 and the solenoid valve 224 are opened, and if the other solenoid valves of the apparatus 30 are closed, nitrogen purges oil from the filter housing 50 through the solenoid valve 232 to the drain, whereupon the replaceable microporous cartridge 52 may be replaced. If the solenoid valve 238 and the solenoid valve 224 are opened, and if the other solenoid valves of the apparatus 30 are closed, nitrogen purges oil from the filter housing 54 through the solenoid valve 238 to the drain, whereupon the replaceable microporous cartridge 56 may be replaced.

Back pressure exhibited by the filter housing 50 containing the replaceable microporous cartridge 52 is monitored by a pressure gauge 254 (FIG. 8) of conventional type. Back pressure exhibited by the filter housing 54 containing the replaceable microporous cartridge 56 is monitored by a pressure gauge 256 (FIG. 8) of similar type. The pressure gauge for the filter housing 50 is connected, via a conduit 250 to a pressure switch 252, which may be Acco/Bristol Model 506035-05-0, and which is set to close whenever a pressure exceeding 20 psig is received by the pressure switch 252.

Provision also is made for air from the filter housing 50, the filter housing 54, or both to be exchanged for oil from the settling tank 130. The filter housing 50 contains air after the replaceable microporous cartridge 52 is replaced. The filter housing 54 contains air after the replaceable microporous cartridge 56 is replaced. Oil from the carboy 60 cannot be added, for the monitored level of oil in the settling tank 130 and the monitored level of oil in the vacuum pump 70 are unaffected by air in the filter housing 50, the filter housing 54, or both. If the solenoid valves 154 and 180 are opened, if the oil pump 132 is operated, and if the other solenoid valves of the apparatus 30 are closed, air from the filter housing 50, the filter housing 54, or both is exchanged for oil from the settling tank 130. Oil is pumped from the settling tank 130 by the oil pump 132 through the conduit 158, the solenoid valve 154, the conduit 158, the oil pump 132, the conduit 160, the check valve 162, the conduit 164, the filter housing 50 containing the replaceable microporous cartridge 52, the conduit 166, the filter housing 54 containing the replaceable microporous cartridge 56, the conduit 168, the conduit 184, the solenoid valve 180 bypassing the vacuum pump 70, the conduit 182, and the conduit 152, into the settling tank 130. The monitored level of oil in the settling tank 130 thus may fall below the predetermined level of oil for the settling tank 130, whereupon the settling tank 130 may be refilled with oil from the carboy 60, as discussed above.

Figure 13:
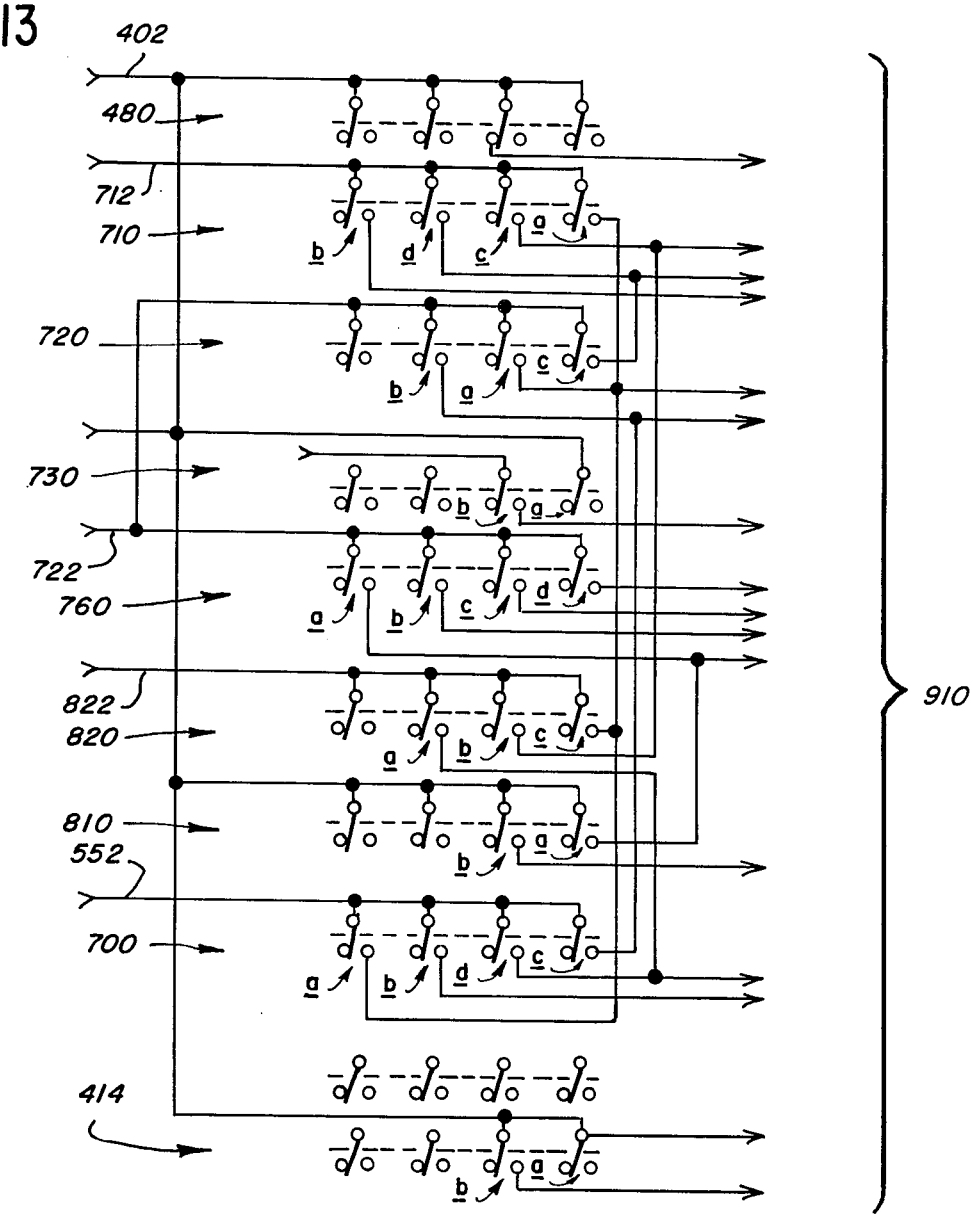
FIG. 13 is a schematic diagram of certain interdependent switches of FIGS. 9 through 11.
Figure 12:
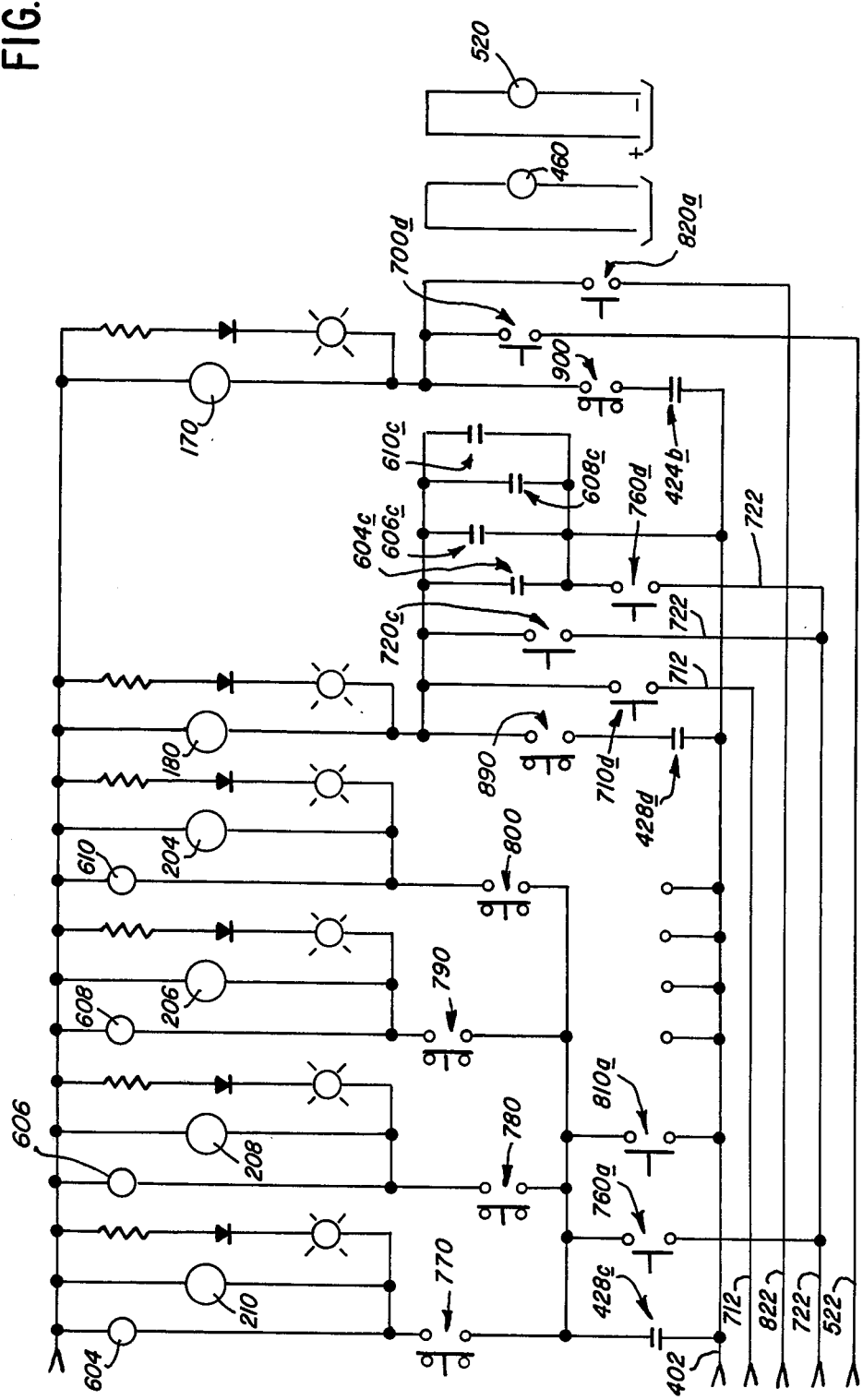

Further details of the settling tank 130 are disclosed in FIGS. 14 through 16. The settling tank 130 comprises a rectangular box, of rigid transparent material, and is divided into a first chamber 330, a second chamber 332, a third chamber 334, and a fourth chamber 336, by a longitudinal partition 338, a lateral partition 340 between the longitudinal partition 338 and a back wall 342 of the settling tank 130, as shown in FIGS. 12 through 14, and a lateral partition 344 between the longitudinal partition 338 and a front wall 346 of the settling tank 130, as shown in FIGS. 14 through 16. The lateral partition 340 and the lateral partition 344 extend upwardly from a bottom panel 348 of the settling tank 130 but are spaced from a top panel 350 of the settling tank 130. FIG. 14 shows a space 352 as thus provided between the lateral partition 344 and the top panel 350. A similar space (not shown) between the lateral partition 340 and the top panel 350 allows oil to spill from the chamber 332 to the chamber 330. A cut-out 354, which is provided at an upper corner of the longitudinal partition 338, allows oil to spill from the chamber 334 to the chamber 332. The space 352 between the lateral partition 344 and the top panel 350 allows oil to spill from the chamber 336 to the chamber 334.

The first chamber 330 has a lateral baffle 356 extending downwardly from the top panel 350, for about two-thirds of its depth, between the longitudinal partition 338 and the back wall 342, and about midway between a left wall 358 of the settling tank 130, as shown in FIGS. 12 through 14 and the lateral partition 340. The second chamber 332 has a lateral baffle 360 extending downwardly from the top panel 350, for about two-thirds of its depth, between the longitudinal partition 338 and the back wall 342, and about midway between a right wall 362 of the settling tank 130, as shown in FIGS. 14 through 16 and the lateral partition 340. The third chamber 334 has a lateral baffle 364 extending downwardly from the top panel 350, for about two-thirds of its depth, between the longitudinal partition 338 and the front wall 346, and about midway between the right wall 362 and the lateral partition 344. The fourth chamber 336 has a lateral baffle 366 extending downwardly from the top panel 350, for about two-thirds of its depth, between the longitudinal partition 338 and the front wall 346, and about midway between the left wall 358 and the lateral partition 344. As shown in FIG. 14, a notch 368 is provided in the lateral baffle 364 where the lateral baffle 366 meets the top panel 350, so as to allow air to flow from chamber to chamber. Similar notches are provided in the lateral baffles 356, 360, and 366.

The top panel 350 is provided with an aperture 376, which accommodates the liquid-level switch 198, an aperture 378, to which the conduit 156 is connected, to conduct oil to the solenoid valve 154 from the settling tank 130, as described above, and an aperture 380, to which the conduit 152 is connected to vent air from the settling tank 130 as described above. The apertures 376, 378, and 380 communicate with the first chamber 330. The top panel 350 also is provided with an aperture 382, which is connected by the conduit 152 from the solenoid valve 150, and which communicates with the fourth chamber 336 to conduct oil into the settling tank 130. Oil flows through the aperture 378 into the chamber 336, over the lateral partition 366 into the chamber 334, through the cut-out 354 into the third chamber 332 over the lateral partition 340 into the chamber 330, and through the aperture 378 from the chamber 330.

As shown in FIG. 16, the bottom panel 348 has an aperture 390, which is the drain outlet for the first chamber 330 and which is connected to the solenoid valve 204 as described above, an aperture 392, which is the drain outlet for the second chamber 332 and which is connected to the solenoid valve 210 as described, above, an aperture 394, which is the drain outlet for the third chamber 334 and which is connected to the solenoid valve 208 as described above, and an aperture 396, which is the drain outlet for the fourth chamber 336 and which is connected to the solenoid valve 206 as described above. The apertures 390, 392, 394, and 396 permit the chambers 330, 332, and 336 to be drained of sediment as described above, and to be purged with nitrogen as described above.

Figure 10:
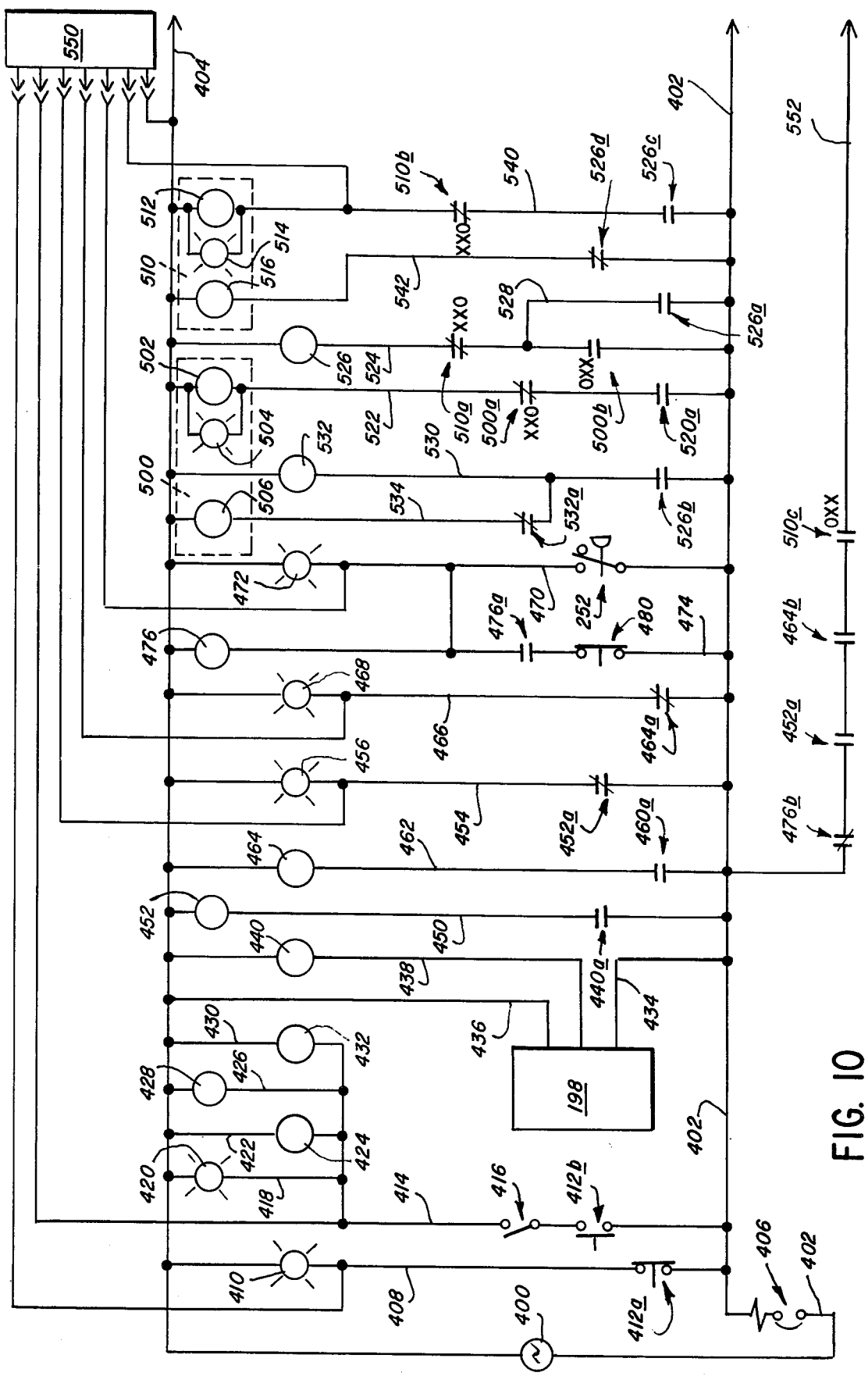
FIGS. 10 through 12 are respective left, center, and right portions of a schematic diagram of electrical components of said apparatus.
Figure 11:
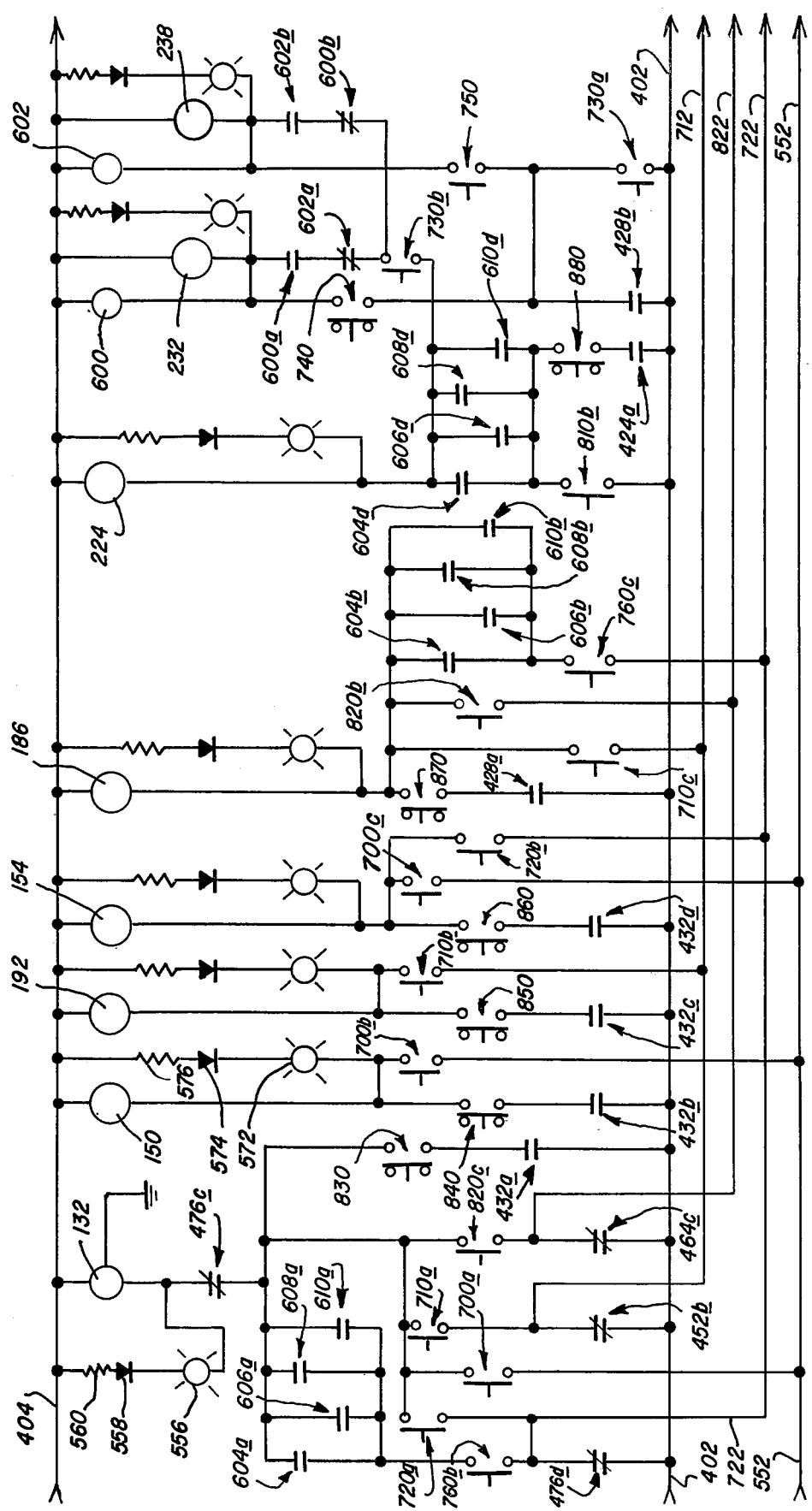

As diagrammed in FIGS. 10 through 12, the apparatus 30 is operable when connected to a source 400 of electrical power (120 VAC, 60 Hz) at a power line 402 and a return line 404. A circuit breaker (10 amp.) 406 is provided in the power line 402. A branch line 408 includes a lamp 410, which indicates automatic control of the apparatus 30 when energized, and certain normally closed contacts 412a of a switch 412, which is used to terminate automatic control and initiate manual control as described below. A branch line 414 includes certain normally opened contacts 412b of the switch 412 and a normally opened switch 416, which requires a key (not shown) to be closed, for limited access to manual control of the apparatus 30. The branch line 414 connects the power line 402 to branch line 404 through parallel lines—a line 418 including a lamp 420, which indicates manual control of the apparatus 30 when lighted, a line 422 including a relay 424, a line 426 including a relay 428, and a line 430 including a relay 432. The relays 424, 428, and 432 must be energized for manual control of the apparatus 30 as described below.

The liquid-level switch 198, as mentioned above, is connected (at appropriate leads as provided conventionally on such liquid-level switches) so as to be energized through a line 434, which is connected to the power line 402, and a line 436, which is connected to the return line 404. The liquid-level switch 198 monitors a level of oil in the settling tank as described above. The liquid-level switch 198 also is connected via a line 438 (at a lead as provided conventionally on such liquid-level switches) so as to deenergize a time-delay relay 440 whenever the monitored level of oil in the settling tank 130 falls below a predetermined level. Once said predetermined level has been reached upon addition of oil from the carboy 60 to the settling tank 130 as described above, the time-delay relay 440 imparts a predetermined delay, which may be ten seconds, before its normally opened contacts 440a included in a branch line 450 are closed. The branch line 450 also includes a relay 452, which must be energized for automatic control of the apparatus 30 as described below, and which also must be deenergized for the settling tank 130 to be refilled with oil from the carboy 60 as described below. A branch line 454 contains certain normally closed contacts 452a of the relay 452 and a lamp 456. Whenever the relay 452 is energized through the normally opened contacts 452a of the time-delay relay 452, the normally closed contacts 452a are opened, so as to deenergize the lamp 456. Otherwise, the lamp 456 is energized so as to indicate that the monitored level of oil in the settling tank 130 has fallen below said predetermined level.

The optical-electronic sensor 100, as described above, is connected as shown in FIG. 9 and described above, so as to deenergize a time-delay relay 460 (FIG. 12) whenever the monitored level of oil in the vacuum pump 70 falls below a predetermined level. Once said predetermined level has been reached upon addition of oil from the carboy 60 to the vacuum pump 70 as described above, the time-delay relay 460 imparts a predetermined delay, which may be several seconds, before its normally opened contacts 460a included in a branch line 462 (FIG. 9) are closed. The branch line 462 also includes a relay 464, which must be energized for automatic control of the apparatus 30 as described below, and which must be deenergized for the vacuum pump 70 to be refilled with oil from the carboy 60 as described below. A branch line 466 contains certain normally closed contacts 464a of the relay 464 and a lamp 468. Whenever the relay 464 is energized through the normally opened contacts 460a of the time-delay relay 460, its normally closed contacts 452a are opened, so as to deenergize the lamp 468. Otherwise, the lamp 468 is energized, so as to indicate that the monitored level of oil in the vacuum pump 70 has fallen below said predetermined level.

The pressure switch 252, as described above, is included in a branch line 470, which also includes a lamp 472. When energized, the lamp 472 indicates that the pressure switch 252 is closed, whereupon the replaceable microporous cartridge 52, the replaceable microporous cartridge 56, or both, must be replaced as discussed above. The branch line 470 is connected, as shown, so as to cause a relay 476 included in the branch line 474 to be energized whenever the pressure switch 252 is closed. The branch line 474 also includes certain normally opened contacts 476a of the relay 476 and a normally closed switch 480. When closed, the normally opened contacts 476a of the relay 476 so as to cause the relay 476 to remain energized after the pressure switch 252 is opened. The relay 476 may be reset by manual actuation of the normally closed switch 480 to its opened mode. The relay 476 must be deenergized for automatic control of the apparatus 30 as described below.

A counter 500—ATC Model 326A-350-A-20-Px, as available from Automatic Timing & Control Co. Div., American Manufacturing Co., Inc., King of Prussia, PA 19406, or equivalent—comprises a motor 502, a lamp 504, which is connected across the motor 502 so as to be energized when the motor 502 is energized, and a clutch 506, which is arranged to be engaged when deenergized and to be disengaged when energized. The counter 500 is arranged for a counting cycle wherein the counter 500 counts down from a predetermined integer, four as an example in present context, by integers to zero in successive counting steps. The clutch 506 must be disengaged as a precondition of each counting step, which begins once the motor 502 is energized and begins to operate, and which concludes once the motor 502 is deenergized and stops. The counter 500 has plural sets of switchable contacts having three modes for each set, a first mode before a counting cycle begins, a second mode while a counting cycle continues, and a third mode after a counting cycle concludes. Each set of contacts, as noted below, is opened or closed in the respective modes. An integral number of successive counting steps constitute a counting cycle. Before a counting cycle begins, the counter 500 must be reset as described below, whereupon each set of the contacts is restored to its first mode. Once a counting step beginning the counting cycle begins, each set of the contacts is switched to its second mode, wherein such set of the contacts remains until the counting cycle concludes. Once the counting step concluding the counting cycle concludes, each set of the contacts switches to its third mode, wherein such set of the contacts remains until the counter 500 is reset for another counting cycle. When energized, the clutch 506 resets the counter 500 for another counting cycle, whereupon each set of the contacts is restored to its first mode.

A timer 510—ATC Model 325A-347-A-20-Px, as also available from Automatic Timing & Controls Co. Div., American Manufacturing Co., Inc., King of Prussia, PA 19406, or equivalent—is similar in some respects to the counter 500. The timer 510 comprises a motor 512, a lamp 514, which is connected across the motor 512 so as to be energized when the motor 512 is energized, and a clutch 516, which is arranged to be engaged when deenergized and to be disengaged when energized. The timer 510 is arranged for a timing cycle of a predetermined duration, thirty minutes as an example in present context. The clutch 516 must be engaged as a precondition of a timing cycle, which begins once the motor 512 is energized and begins to operate, and which concludes once the motor 512 is deenergized and stops. The timer for 510 has plural sets of switchable contacts having three modes for each set, a first mode before a timing cycle begins, a second mode while a timing cycle continues, and a third mode after a timing cycle concludes. Each set of the contacts, as noted below, is opened or closed in the respective modes. Before a timing cycle begins, the timer 510 must be reset as described below, whereupon each set of the contacts is restored to its first mode. Once a timing cycle begins, each set of the contacts is switched to its second mode, wherein such set of the contacts remains until the timing cycle concludes. Once the timing cycle concludes, each set of the contacts switches to its third mode, wherein such set of the contacts remains until the timer 510 is reset for another timing cycle. When energized, clutch 516 resets the timer 510 for another timing cycle, whereupon each set of the contacts is restored to its first mode.

Pertinent notation in FIGS. 9 through 11 represents the three modes for the contacts of the counter 500 and for the contacts of the timer 510, by three successive letters wherein "X" refers to closed contacts and "O" refers to opened contacts. As an example, XXO represents closed contacts in the first mode, closed contacts in the second mode, and opened contacts in the third mode.

A relay 520 (FIG. 12), which operates on 24 VDC is connected so as to be energized whenever the solenoid valve 120 is energized as discussed above. When energized, the solenoid valve 120 admits reactive gas (dichlorosilane, $SiH_2Cl_2$, in the example of particular interest) to the diffusion furnace (not shown) in which a partial vacuum is maintained by the vacuum pump 70. In known manner, the solenoid valve 120 becomes energized approximately when a run of chemical vapor deposition in the diffusion furnace is initiated, remains energized approximately throughout the run, and becomes deenergized approximately when the run is terminated. Thus, the relay 520 becomes energized approximately when the run is initiated, remains energized approximately throughout the run, and becomes deenergized approximately when the run is terminated.

The motor 502 of the counter 500 is connected in a branch line 522, so as to be energized through certain normally opened contacts 520a of the relay 520, and through certain contacts 500a of the counter 500. The contacts 510a are closed in the first and second modes and opened in the third mode. So long as the contacts 500a remain closed, the motor 502 becomes energized whenever the relay 520 becomes energized, and the motor 502 becomes deenergized whenever the relay 520 becomes deenergized. So long as the clutch 506 also is deenergized, a counting step of the counter 500 begins once the motor 502 thus becomes energized, whereupon the contacts of the counter 500 are switched from the first mode to the second mode, as an analog of initial stages of a run of chemical vapor deposition in the diffusion furnace. The counting step concludes once the motor 502 thus is deenergized. If the counting step is prior-to-last in a counting cycle, the contacts of the counter 500 remain in the second mode. Once the counting step concluding the counting cycle concludes, the contacts of the counter 500 are switched to the third mode, as an analog of terminal stages of the run, whereupon the contacts 500a are opened to prevent another counting step before the counter 500 is reset.

A branch line 524 includes certain contacts 500b of the counter 500, certain contacts 510a of the timer 510, and a relay 526. The contacts 500b are opened in the first mode, opened in the second mode, and closed in the third mode, of the counter 500. The contacts 510a are closed in the first mode, closed in the second mode, and opened in the third mode. So long as the contacts 510a remain closed, the relay 526 remains deenergized before the counting cycle begins and while the counting cycle continues, and the relay 526 becomes energized once the counting cycle concludes. Certain normally opened contacts 526a of the relay 526 are connected, in a branch line 528 across the contacts 500b to the power line 402, so as to latch the relay 526 once the relay 526 becomes energized.

A branch line 530 includes certain normally opened contacts 526b of the relay 526 and also includes a time-delay relay 532. A branch line 534, which includes certain normally closed contacts 532a of the time-delay relay 532 and the clutch 506 of the counter 500, is connected across the time-delay relay 532 to the return line 404. The relay 532 is arranged to open its normally closed contacts 532a after a predetermined delay, ten seconds as an example, once the time-delay relay 532 becomes energized. Once the relay 526 becomes energized, its normally opened contacts 526b are closed, whereupon the clutch 506 becomes energized through the normally closed contacts 532a of the time-delay relay 532 so as to reset the counter 500 for another counting cycle as discussed above, and whereupon the time-delay relay 532 also becomes energized. After the predetermined delay, its normally closed contacts 532a are opened, so as to deenergize the clutch 506 as a precondition for another counting cycle as discussed above.

The motor 512 of the timer 510 is connected, in a branch line 540, so as to be energized through certain normally opened contacts 526c of the relay 526 and through certain contacts 510b of the timer 510. The contacts 510b are closed in the first and second modes and opened in the final mode. The clutch 516 is connected, in a branch line 542, so as to be energized through certain normally closed contacts 526d of the relay 526. Thus, the clutch 516 is energized whenever the relay 526 is deenergized, and the clutch 516 is deenergized whenever the relay 526 is energized. So long as the contacts 510b remain closed, the motor 512 becomes energized whenever the relay 526 becomes energized and the motor 512 becomes deenergized whenever the relay 526 becomes deenergized. So long as the clutch 516 also is engaged, a timing cycle of the timer 510 begins once the motor 512 thus becomes energized, whereupon the contacts of the timer 510 are switched from the first mode to the second mode, so as to enable a settling and filtering cycle of the apparatus 30 as described below. Once the timing cycle concludes, the contacts of the timer 510 are switched from the second mode to the third mode, whereupon the contacts 510b are opened so as to deenergize the motor 512, the contacts 510a are opened so as to deenergize the relay 526, which allows its normally opened contacts 526a, 526b, and 526c to be opened and its normally closed contacts 526d to be closed. Thus, the clutch 516 is energized, so as to reset the timer 510 for another timing cycle.

Parallel connections are made across each of the lamps 410, 420, 456, 468, 472, 504, and 514, to respective corresponding lamps (not shown) of a remote indicator 550, which is connected via the connector 124 as shown in FIG. 9.

As described below, automatic control of the apparatus 30 is energized through a branch line 552 connected to the power line 402. The branch line 552 includes certain normally closed contacts 476b of the relay 476, which is associated with the pressure switch 252, certain normally opened contacts 452a of the relay 452, which is associated with the liquid-level switch 198 monitoring a level of oil in the settling tank 130, certain normally opened contacts 464b of the time-delay relay 464, which is associated with the optical-electronic switch 100 monitoring a level of oil in the vacuum pump 70, and certain normally opened contacts 510c of the timer 510. Thus, automatic control of the apparatus 30 is disabled unless the pressure switch 252 is opened, the relay 452 is energized, and the time-delay relay 464 is energized, and except in a timing cycle of the timer 510.

The oil pump 132 is connected to the return line 404—in parallel with a lamp 556 (28VDC) which is connected via a rectifying diode 558 (Type IN4004), and a limiting resistor 560 (2K ohm, 2 watt) to the return line 404—so as to be energizable in alternative modes, except when certain normally closed contacts 476c of the relay 476 associated with the pressure switch 252 are opened. The oil pump 132 is connected so as to be energized through the normally closed contacts 476c. Thus, the oil pump 132 cannot be operated while the pressure switch 252 is closed, as a precaution to prevent any operation of the oil pump 132 at excessive pressures.

The solenoid valve 150, which controls flow of oil from the vacuum pump 70 as discussed above, the solenoid valve 192, which vents air from the settling tank 130 as discussed above, the solenoid valve 154, which controls flow of oil from the settling tank 130 as discussed above, the solenoid valve 186, which controls flow of oil from the carboy 60 as discussed above, the solenoid valve 224 which controls flow of nitrogen as discussed above, the solenoid valve 232, which controls flow of oil from the drain outlet of the filter housing 50 as discussed above, the solenoid valve 238 which controls flow of oil from the drain outlet of the filter housing 54 as discussed above, the solenoid valve 210, which controls drainage of oil and sediment from one chamber of the settling tank 130 as discussed above, the solenoid valve 208, which controls drainage of oil and sediment from another chamber of the settling tank 130 as discussed above, the solenoid valve 206, which controls drainage of oil and sediment from another chamber of the settling tank 130 as discussed above, the solenoid valve 204, which controls drainage of oil and sediment from another chamber of the settling tank 130 as discussed above, the solenoid valve 180, which bypasses the vacuum pump 70 as discussed above, and the solenoid valve 170, which controls flow of oil into the vacuum pump 70 as discussed above, are arranged to be opened when energized and to be closed when deenergized, connected to the return line 404 as shown, and connected so as to be energizable in alternative modes, along with the oil pump 132 in some modes. Each of the solenoid valves is connected in parallel with a lamp (28 VDC) which is connected via a rectifying diode (type IN4004) and a limiting resistor (2K ohm, 2 watt) to the return line 404. As an example, the solenoid valve 150 is connected in parallel with a lamp 572, which is connected to the solenoid valve 150, and which is connected via a rectifying diode 574 and a limiting resistor 576 to the return line 404. Also, a relay 600 is connected in parallel with the solenoid valve 232, a relay 602 is connected in parallel with the solenoid valve 238, a relay 604 is connected in parallel with the solenoid valve 210, a relay 606 is connected in parallel with the solenoid valve 208, a relay 608 is connected in parallel with the solenoid valve 206, and a relay 610 is connected in parallel with the solenoid valve 204.

In one mode of the apparatus 30, for automatic control of the settling and filtering cycles of the apparatus 30, a switch 700 must be actuated. The oil pump 132 is connected, via the normally closed contacts 476c of the relay 476 associated with the pressure switch 252, to certain contacts 700a of the switch 700. The solenoid valve 150, which controls flow of oil from the vacuum pump 70 as discussed above, is connected to other contacts 700b of the switch 700. The solenoid valve 154, which controls flow of oil from the settling tank 130, is connected to other contacts 700c of the switch 700. The solenoid valve 170, which controls flow of oil to the vacuum pump 70, is connected to other contacts 700d of the switch 700. The contacts 700a, 700b, 700c, and 700d re connected by the branch line 552 to the contacts 510c of the timer 510. So long as the normally closed contacts 476b and 476c remain closed, so long as the normally opened contacts 452a of the relay 452 associated with the liquid-level switch 198 are closed, so long as the normally opened contacts 464b of the relay 464 associated with the optical-electronic sensor 100 are closed, and if the switch 700 is actuated so as to close the contacts 700a, 700b, and 700c, the solenoid valves 150, 154, and 170 are energized and the oil pump 132 is energized, whenever the contacts 510c are closed by the timer 510 as discussed above. Similarly, the oil pump 132 is deenergized and the solenoid valves 150, 154, and 170 are deenergized whenever the contacts 510c are opened by the timer 510.

In another mode of the apparatus 30, for oil from the carboy 60 to be added to the settling tank 130, a switch 710 must be actuated. The oil pump 132 is connected, via the normally closed contacts 476c of the relay 476 associated with the pressure switch 252, to certain contacts 710a of the switch 710. The solenoid valve 192, which vents air from the settling tank 130, is connected to other contacts 710b of the switch 710. The solenoid valve 186, which controls flow of oil from the carboy 60 as discussed above, is connected to other contacts 710c of the switch 710. The solenoid valve 180, which bypasses the vacuum pump 70 as discussed above, is connected to other contacts 710d of the switch 710. The contacts 710a, 710b, 710c, and 710d are connected by a branch line 712, via certain normally closed contacts 452b of the relay 452 associated with the liquid-level switch 198 as discussed above to the power line 402. So long as the normally closed contacts 452b remains closed, and if the switch 710 is actuated so as to close the contacts 710a, 710b, 710c, and 710d, and the solenoid valves 192, 186, and 180 are energized, also and so long as the normally closed contacts 476c remain closed, the oil pump 132 is energized.

In another mode of the apparatus 30, for air from the filter housing 50, the filter housing 54, or both to be exchanged for oil from the settling tank 130, a switch 720 must be actuated. The oil pump 132 is connected, via the normally closed contacts 476c of the relay 476 associated with the pressure switch 252, to certain contacts 720a of the switch 720. The solenoid valve 154, which controls flow of oil from the settling tank 130, is connected to other contacts 720b of the switch 720. The solenoid valve 180, which bypasses the vacuum pump 70, is connected to other contacts 720c of the switch 720. The contacts 720a, 720b, and 720c are connected by a branch line 722, via certain normally closed contacts 476d of the relay 476 associated with the pressure switch 252, to the power line 402.

In another mode of the apparatus 30, for the filter housing 50 containing the replaceable microporous cartridge 52 to be purged with nitrogen as discussed above, a switch 730 and a switch 740 must be actuated. The solenoid valve 232, which controls drainage of oil and sediment from the filter housing 50, and the relay 600, which is associated with the solenoid valve 232, are energized through certain contacts 730a of the switch 730 and through the switch 740 as shown. The solenoid valve 224, which controls flow of nitrogen, is connected, via other contacts 730b of the switch 730, certain normally closed contacts 602a of the relay 602 associated with the solenoid valve 238 for the filter housing 54, and certain normally opened contacts 600a of the relay 600, to the contacts 740a, the relay 600, and the solenoid valve 232. After the filter housing 50 is purged, the switch 740 must be deactuated. Also, it may be necessary for the switch 480 to be actuated momentarily so as to reset the relay 476 associated with the pressure switch 252 as discussed above, whereupon the replaceable microporous cartride 52, the replaceable microporous cartridge 56, or both may be replaced.

In another mode of the apparatus 30, for the filter housing 54 containing the replaceable microporous cartridge 56 to be purged with nitrogen as discussed above, the switch 730 and a switch 750 must be actuated. The solenoid valve 238, which controls drainage of oil and sediment from the filter housing 54, and the relay 602, which is associated with the solenoid valve 238, are energized through the contacts 730a of the switch 730 and through the switch 750, as shown. The solenoid valve 224, which controls flow of nitrogen, is connected, via the contacts 730b of the switch 730, certain normally closed contacts 600b of the relay 600 associated with the solenoid valve 232 for the filter housing 54, and certain normally opened contacts 602b of the relay 602, to the contacts 740a, the relay 600, and the solenoid valve 232. After the filter housing 54 is purged, the switch 750 must be deactuated. Also, it may be necessary for the switch 480 to be actuated so as to reset the relay 476 associated with the pressue switch 252 as discussed above whereupon the replaceable microporous cartridge 52, the replaceable microporous cartridge 56, or both may be replaced.

Because of the normally closed contacts 602a of the relay 602, the filter housing 50 cannot be purged while the solenoid valve 238 for the filter housing 54 is energized. Because of the normally closed contacts 600b of the relay 600, the filter housing 54 cannot be purged while the solenoid valve 232 for the filter housing 50 is energized. The switch 730 must be actuated for either filter housing to be purged with nitrogen. Selective actuation of the switch 740 for the filter housing 50 and the switch 750 for the filter housing 54 is appropriate.

In another mode of the apparatus 30, for oil from the carboy 60 to displace sediment from selected compartments of the settling tank 130 as discussed above, a switch 760 must be actuated and a switch 770, a switch 780, a switch 790, a switch 800, or any combination of the switches 770, 780, 790, and 800 must be actuated.

The solenoid valve 210, which controls drainage of oil and sediment from one compartment of the settling tank 130, and the relay 604, which is associated with the solenoid valve 210, are energized from the branch line 722 through certain contacts 760a of the switch 750 and through the switch 770. The solenoid valve 208, which controls drainage of oil and sediment from another compartment of the settling tank 130, and the relay 606, which is associated with the solenoid valve 208, are energized from the branch line 722 through the contacts 760a and through the switch 780. The solenoid valve 206, which controls drainage of oil and sediment from another compartment of the settling tank 130, and the relay 608, which is associated with the solenoid valve 206, are energized from the branch line 722 through the contacts 760a and the switch 790. The solenoid valve 204, which controls drainage of oil and sediment from another compartment of the settling tank 130, and the relay 610, which is associated with the solenoid valve 204, are energized from the branch line 722 through the contacts 760a and the switch 800. The contacts 760a are connected between the branch line 722 and the switches 770, 780, 790, and 800. Hence, the solenoid valves 210, 208, 206, and 204 cannot be energized if the normally closed contacts 476d of the relay 476 associated with the pressure switch 252 are opened. The oil pump 132 is energized from the power line 402 through the normally closed contacts 476d, other contacts 760b of the switch 760, and whichever of certain normally opened contacts 604a of the relay 604, certain normally opened contacts 606a of the relay 606, certain normally opened contacts 608a of the relay 608, and certain normally opened contacts 610a of the relay 610, in parallel as shown, are closed. The solenoid valve 186, which controls flow of oil from the carboy 60, is energized from the power line 402 through the normally closed contacts 476d, other contacts 760c of the switch 760, and which ever of other normally opened contacts 604b of the relay 604, other normally opened contacts 606b of the relay 606, other normally opened contacts 608b of the relay 608, and certain normally opened contacts 610b of the relay 610, in parallel as shown, are closed. The solenoid valve 180, which bypasses the vacuum pump 70, is energized through the normally closed contacts 476d, other contacts 760d of the switch 760, and whichever of other normally opened contacts 604c of the relay 604, other normally opened contacts 606c of the relay 606, other normally opened contacts 608c of the relay 608, and other normally opened contacts 610c of the relay 610, in parallel as shown, are closed.

In another mode of the apparatus 30, for the settling tank 130 to be purged with nitrogen, a switch 810 must be actuated and the switch 770, the switch 780, the switch 790, the switch 800, or any combination of the switches 770, 780, 790, and 800 must be actuated. The solenoid valve 210 and the relay 604 are energized from the power line 402 through certain contacts 810a of the switch 810 and through the switch 770. The solenoid valve 208 and the relay 606 are energized from the power line 402 through the contacts 810a and the switch 780. The solenoid valve 206 and the relay 608 are energized from the power line 402 through the contacts 810a and the switch 790. The solenoid valve 204 and the relay 610 are energized from the power line 402 through the contacts 810a and the switch 800. The solenoid valve 224, which controls flow of nitrogen, is energized from the power line 402 through other contacts 810b of the switch 810 and whichever of certain normally opened contacts 604d of the relay 604, certain normally opened contacts 606d of the relay 606, certain normally opened contacts 608d of the relay 608, and certain normally opened contacts 610d of the relay 610, in parallel as shown, are closed.

In another mode of the apparatus 30, for oil from the carboy 60 to fill the vacuum pump 70, a switch 820 must be actuated. The solenoid valve 170, which controls flow of oil into the vacuum pump is energized through certain normally closed contacts 464c of the relay 464 associated with the optical-electronic sensor 100 and through certain contacts 820a of the switch 820. The solenoid valve 186, which controls flow of oil from the carboy 60, is energized through the normally closed contacts 464c and through other contacts 820b of the switch 820. The oil pump 132 is energized through the normally closed contacts 464c and through other contacts 820c of the switch 820. The contacts 820a, 820b, and 820c are connected to the normally closed contacts 464c by a branch line 822.

In another mode of the apparatus 30, for manual control of certain components of the apparatus 30, the normally opened switch 416, which requires the key to be closed, must be closed and the switch 414 must be closed so as to energize the relays 424, 428, and 432. The oil pump 132 may be energized from the power line 402 through certain normally opened contacts 432a of the relay 432, and through a switch 830, which must be actuated to energize the oil pump 132. The solenoid valve 150, which controls flow of oil from the vacuum pump 70, may be energized from the power line 402 through other normally opened contacts 432b of the relay 432, and through a switch 840, which must be actuated to energize the solenoid valve 150. The solenoid valve 192, which vents air from the settling tank 130, may be energized from the power line 402 through other normally opened contacts 432c of the relay 432, and through a switch 850, which must be actuated to energize the solenoid valve 192. The solenoid valve 154, which controls flow of oil from the settling tank 130, may be energized from the power line 402 through other normally opened contacts 432d of the relay 432, and through a switch 860, which must be actuated to energize the solenoid valve 154. The solenoid valve 186, which controls flow of oil from the carboy 60, may be energized from the power line 402 through certain normally opened contacts 428a of the relay 428, and through a switch 870, which must be actuated to energize the solenoid valve 186. The solenoid valve 224, which controls flow of nitrogen, may be energized from the power line 402, if one or more of the solenoid valves 210, 208, 206, and 204 are energized through certain normally opened contacts 424a of the relay 424, through a switch 880, which must be actuated to energize the solenoid valve 224, and through whichever of the normally opened contacts 604d of the relay 604, the normally opened contacts 606d of the relay 606, the normally opened contacts 608d of the relay 608, and the normally opened contacts 610d of the relay 610, in parallel as shown, are closed. The solenoid valve 232, which controls drainage of oil from the filter housing 50, may be energized through other normally opened contacts 428b of the relay 428, and through the switch 740, which must be actuated to energize the solenoid valve 232. The solenoid valve 238, which controls drainage from the filter housing 54, may be energized through the normally opened contacts 428b, and through the switch 750, which must be actuated to energize the solenoid valve 238. The solenoid valve 210, which controls drainage of oil and sediment from one chamber of the settling tank 130, may be energized through other normally opened contacts 428c of the relay 428, and through the switch 770, which must be actuated to energize the solenoid valve 210. The solenoid valve 208, which controls drainage of oil and sediment from another chamber of the settling tank 130, may be energized through the normally opened contacts 428c and through the switch 780, which must be actuated to energize the solenoid valve 208. The solenoid valve 206, which controls drainage of oil and sediment from another chamber of the settling tank 130, may be energized through the normally opened contacts 428c, and through the switch 790, which must be actuated to energize the solenoid valve 206. The solenoid valve 204, which controls drainage of oil and sediment from another chamber of the settling tank 130, may be energized through the normally opened contacts 428c, and through the switch 800, which must be actuated to energize the solenoid valve 204. The solenoid valve 180, which bypasses the vacuum pump 70, may by energized through other normally opened contacts 428d of the relay 428, and through a switch 890, which must be actuated to energized the solenoid valve 180. The solenoid valve 170, which controls flow of oil into the vacuum pump 70, may be energized through other normally opened contacts 424b of the relay 424, and through a switch 900, which must be actuated to energize the solenoid valve 170.

In another mode of the apparatus 30, for standby conditions, the normally closed switch 480 is actuated for reasons explained below. The normally closed switch 480 also is used to reset the relay 476 associated with the pressure switch 252 as discussed above.

The switch 700, which must be actuated for automatic control of the settling and filtering cycles of the apparatus 30, the switch 710, which must be actuated for oil from the carboy 60 to be added to the settling tank 130, the switch 720, which must be actuated for air from the filter housing 50, the filter housing 54, or both to be exchanged for oil from the settling tank 130, the switch 730, which must be actuated for either filter housing to be purged with nitrogen, the switch 760, which must be actuated for oil from the carboy 60 to displace sediment from selected compartments of the settling tank 130, the switch 810, which must be actuated for the settling tank 130 to be purged with nitrogen, the switch 820, which must be actuated for oil from the carboy 60 to fill the vacuum pump 70, the switch 412, which must be closed for manual control of certain components of the apparatus 30, and the normally closed switch 480, which must be actuated for standby conditions and to reset the relay 476, are interdependent, so as to entail deactuation of all others upon actuation of any one of the switches 700, 710, 720, 730, 760, 810, 820, 412, and 480, which may be respective stations of a multiple-station switch, which may be Switchcraft Multi-Switch Model 67101K-512 having ten stations and four sets of switchable contacts in each station, as diagrammed in FIG. 12.

The switch 830, which must be actuated to energize the oil pump 132 under manual control, the switch 840, which must be actuated to energize the solenoid valve 150 under manual control, the switch 850, which must be actuated to energize the solenoid valve 192 under manual control, the switch 860, which must be actuated to energize the solenoid valve 154 under manual control, the switch 870, which must be actuated to energize the solenoid valve 186 under manual control, the switch 880, which must be actuated to energize the solenoid valve 226 under manual control, the switch 770, which must be actuated to energize the solenoid valve 210 in certain modes, the switch 780, which must be actuated to energize the solenoid valve 208 in certain modes, the switch 790, which must be actuated to energize the solenoid valve 206 in certain modes, the switch 800, which must be actuated to energize the solenoid valve 204 in certain modes, and the switch 890, which must be actuated to energize the solenoid valve 180 under manual control, and the switch 900, which must be actuated to energize the solenoid valve 170 under manual control, are interdependent, so as to entail deactuation of all others upon actuation of any one of the switches 830, 840, 850, 860, 870, 880, 770, 780, 790, 800, 890, and 900, which may be respective selections of an alternative action switch, which may be Unimax Model 11-271.

In a typical operation of a diffusion furnace as discussed above, silicon nitride, $Si_3N_4$, is deposited at a rate of about 20 Å to about 50Å per minute in a run of about 50 minutes, on 100 or more silicon wafers of average diameter of about two inches (5.08 cm.) to about four inches (10.16 cm.). The wafers are supported perpendicularly (with respect to flow of reactive gases) on a quartz boat, in a quartz tube, in which a partial vacuum is maintained by an oil-sealed mechanical vacuum pump as discussed above. Each run entails a cumulative deposition of about 1000 Å in such run. Conventionally, as much as about 32 gallons of oil and as many as 50 replaceable microporous filters may be needed, for a cumulative deposition of about 500,000 Å, wherein as many as about 50 hours of downtime of the vacuum pump (and thus of the diffusion furnace) may be required for the replaceable microporous filter to be replaced.

However, this invention allows favorable results to be obtained if about ten gallons of oil, one replaceable microporous cartridge having a pore size of about 25 microns, and another replaceable microporous cartridge having a pore size of about five microns are used as discussed above, for a cumulative deposition up to about 500,000 Å, as oil may be added to the carboy from time to time from external sources, so as to replace oil drained from the apparatus, no downtime is required of the vacuum pump.

Further information on a counter suitable for the counter 500 and a timer suitable for the timer 510 may be obtained from published material of American Timing & Controls Co., Div. American Manufacturing Co., Inc., King of Prussia, PA 19406, particularly its publication IN 326 (April 1975) — Installation and Operating Instructions/Series 325 "Tankard" Counter Digital Setting, Pulse-Motor Driven Automatic Reset General Purpose Count Controller and its publication IN 325 (April 1975) — Installation and Operating Instructions/Series 325 "Tankard" Digital Setting, Synchronous Motor Driven Automatic Reset General Purpose Timer. Cross-reference is made to said publications IN 326 (April 1975) and IN 325 (April 1975).

I claim:

1. For a vacuum pump, as used to maintain a partial vacuum in a diffusion furnace for chemical vapor desposition in intermittent runs wherein oil for the vacuum pump becomes contaminated by particulates, an apparatus for removal of particulates from oil for the vacuum pump comprising a settling tank, which is connected to receive oil from the vacuum pump, an oil pump, which is arranged to pump oil from the settling tank, means for filtering particulates from oil pumped from the settling tank, a plurality of oil valves, which are arranged to control flow of oil from the vacuum pump, through the settling tank, through the filtering means, and into the vacuum pump, means for operating the oil pump and opening the oil valves for timed intervals wherein oil flows from the vacuum pump, through the settling tank, through the filtering means, and to the vacuum pump, and means for coordinating the intervals with the runs so that each interval is initiated approximately when a run is terminated.

2. The apparatus of claim 1 wherein said coordinating means initiates each interval approximately when a run concluding a predetermined number of serial runs is terminated.

3. The apparatus of claim 1 wherein the coordinating means comprises means for generating signals corresponding approximately to terminal stages of serial runs, means for counting said signals, ans means for enabling the oil pump-operating and oil valve-opening means whenever a predetermined number of said signals have been counted.

4. The apparatus of claim 3 wherein said counting means is reset for another count after the predetermined number of said signals have been counted.

5. The apparatus of claim 1, 2, 3, or 4 comprising means for monitoring a level of oil in the vacuum pump and disabling the oil pump-operating and oil valve-opening means whenever the monitored level of oil in the vacuum pump falls below a predetermined level, whereby the oil pump cannot be operated and the oil valves cannot be opened whenever the monitored level of oil in the vacuum pump falls below the predetermined level.

6. The apparatus of claim 5 comprising means for adding oil to the vacuum pump between such intervals, while the vacuum pump may continue to operate.

7. The apparatus of claim 1, 2, 3, or 4 comprising means for monitoring a level of oil in the settling tank and disabling the oil pump-operating and oil valve-opening means whenever the monitored level of oil in the settling tank falls below a predetermined level, whereby the oil pump cannot be operated and the oil valves cannot be opened whenever the monitored level of oil in the settling tank falls below the predetermined level.

8. The apparatus of claim 7 comprising means for adding oil to the settling tank between such intervals, while the vacuum pump may continue to operate.

9. The apparatus of claim 1, 2, 3, or 4 comprising means for monitoring back pressure exhibited by the filtering means and disabling the oil pump-operating and oil valve-opening means whenever the filtering means exhibits back pressure above a predetermined pressure, whereby the oil pump cannot be operated and the oil valves cannot be opened whenever the filtering means exhibits back pressure above the predetermined pressure.

10. The apparatus of claim 9 comprising means for purging the filtering means with gas between such intervals, while the vacuum pump may continue to operate.

11. The apparatus of claim 1, 2, 3, or 4 wherein the filtering means comprises a series of microporous filters and wherein said apparatus comprises means for monitoring back pressure exhibited by said series and disabling the oil pump-operating and oil valve-opening means whenever said series exhibits back pressure above a predetermined pressure, whereby the oil pump cannot be operated and the oil valves cannot be opened whenever said series exhibits back pressure above the predetermined pressure.

12. The apparatus of claim 1, 2, 3, or 4 comprising means for displacing sediment from the settling tank between such intervals, while the vacuum pump may continue to operate.

13. The apparatus of claim 1, 2, 3, or 4 comprising means for purging the settling tank with gas between such intervals, while the vacuum pump may continue to operate.

14. The apparatus of claim 1, 2, 3, or 4 wherein the filtering means comprises a series of microporous filters contained in filter housings and wherein the apparatus comprises means for purging the filter housings selectively between such intervals, while the vacuum pump may continue to operate.

15. The apparatus of claim 14 comprising means for exchanging gas in the filter housings for oil from the settling tank between such intervals, while the vacuum pump may continue to operate.

16. A method for removal of particulates from oil for a vacuum pump, as used to maintain a partial vacuum for chemical vapor deposition in intermittent runs wherein oil for the vacuum pump becomes contaminated by particulates, comprising steps of withdrawing oil from the vacuum pump to a settling tank, pumping oil from the settling tank, filtering particulates from oil pumped from the settling tank, and returning oil to the vacuum pump after the filtering step, wherein said steps are performed for timed intervals coordinated with the runs so that each interval is initiated approximately when a run is terminated.

17. The method of claim 16 wherein each interval is initiated approximately when a run concluding a predetermined number of serial runs is terminated.

18. The method of claim 16 wherein the intervals are coordinated with the runs by steps of generating signals corresponding approximately to terminal stages of serial runs, counting said signals, and initiating the steps performed for timed intervals whenever a predetermined number of said signals have been counted.

19. The method of claim 18 wherein said signals are counted by means reset for another count after the predetermined number of said signals have been counted.

20. The method of claim 16, 17, 18, or 19 wherein a level of oil in the vacuum pump is monitored and wherein the steps performed for timed intervals are disabled whenever the monitored level of oil in the vacuum pump falls below a predetermined level.

21. The method of claim 20 comprising a step of adding oil to the vacuum pump between such intervals, while the vacuum pump may continue to operate.

22. The method of claim 16, 17, 18 or 19 wherein a level of oil in the settling tank is monitored and wherein the steps performed for timed intervals are disabled whenever the monitored level of oil in the settling tank falls below a predetermined level.

23. The method of claim 22 comprising a step of adding oil to the settling tank between such intervals, while the vacuum pump may continue to operate.

24. The method of claim 16, 17, 18, or 19 wherein back pressure attending the filtering step is monitored and wherein the steps performed for timed intervals are disabled whenever such pressure exceeds a predetermined pressure.

25. The method of claim 24 wherein a level of oil in the vacuum pump is monitored, wherein the steps performed for timed intervals are disabled whenever the monitored level of oil in the vacuum pump falls below a predetermined level for oil in the vacuum pump, wherein a level of oil in the settling tank is monitored, and wherein the steps performed for timed intervals are disabled whenever the monitored level of oil in the settling tank falls below a predetermined level for oil in the settling tank.

26. The method of claim 16, 17, 18, or 19 wherein oil pumped from the settling tank is filtered through a series of microporous filters, wherein back pressure exhibited by said series is monitored, and wherein the steps performed for timed intervals are disabled whenever said series exhibits back pressure above a predetermined pressure.

27. The method of claim 26 wherein the filters are contained in respective filter housings, and wherein the method comprises a step of purging the filter housings selectively between such intervals, while the vacuum pump may continue to operate.

28. The method of claim 27 comprising means for exchanging gas in the filter housings for oil from the settling tank between such intervals, while the vacuum pump may continue to operate.

29. The method of claim 26 wherein a level of oil in the vacuum pump is monitored, wherein the steps performed for timed intervals are disabled whenever the monitored level of oil in the vacuum pump falls below a predetermined level for oil in the vacuum pump, wherein a level of oil in the settling tank is monitored, and wherein the steps performed for timed intervals are disabled whenever the monitored level of oil in the settling tank falls below a predetermined level for oil in the settling tank.

30. The method of claim 16, 17, 18, or 19 wherein oil in the vacuum pump is contaminated by particulates of ammonium chloride.

31. The method of claim 16, 17, 18, or 19 comprising a step of displacing sediment from the settling tank between such intervals, while the vacuum pump may continue to operate.

32. The method of claim 16, 17, 18, or 19 comprising a step of purging the settling tank with gas between such intervals, while the vacuum pump may continue to operate.

* * * * *